United States Patent
Whitten et al.

(10) Patent No.: US 8,358,765 B1
(45) Date of Patent: Jan. 22, 2013

(54) SYSTEM FOR SIMULTANEOUS DELIVERY OF COMMUNICATION SESSION INVITATION MESSAGES TO COMMUNICATION DEVICES

(75) Inventors: Robert Clark Whitten, Kennesaw, GA (US); Brandon Hall Goode, Canton, GA (US)

(73) Assignee: Cox Communications, Inc., Atlanta, GA (US)

( * ) Notice: Subject to any disclaimer, the term of this patent is extended or adjusted under 35 U.S.C. 154(b) by 399 days.

(21) Appl. No.: 12/751,636

(22) Filed: Mar. 31, 2010

(51) Int. Cl.
*H04M 3/42* (2006.01)

(52) U.S. Cl. ......... 379/211.04; 379/211.02; 379/211.03; 379/212.01; 379/221.08; 379/221.09

(58) Field of Classification Search ............. 379/211.04, 379/212.01, 88.17, 232; 370/312, 331
See application file for complete search history.

(56) References Cited

U.S. PATENT DOCUMENTS

| | | | |
|---|---|---|---|
| 2007/0121854 A1* | 5/2007 | Soo et al. | 379/142.01 |
| 2008/0260137 A1* | 10/2008 | Poi et al. | 379/212.01 |
| 2009/0088174 A1* | 4/2009 | Kikuchi et al. | 455/450 |
| 2009/0103691 A1* | 4/2009 | Hume et al. | 379/88.17 |
| 2009/0310526 A1* | 12/2009 | Gore et al. | 370/312 |
| 2010/0085979 A1* | 4/2010 | Liu et al. | 370/408 |
| 2010/0142477 A1* | 6/2010 | Yokota | 370/331 |
| 2011/0040888 A1* | 2/2011 | Krishnaswamy et al. | 709/231 |

OTHER PUBLICATIONS

Rosenberg et al, RFC 3261, Jun. 2002, All pages.*

* cited by examiner

*Primary Examiner* — Joseph J Nguyen
(74) *Attorney, Agent, or Firm* — Benjamin A. Balser; Balser & Grell IP Law

(57) ABSTRACT

A system for causing the simultaneous, or near simultaneous, receipt by multiple pre-identified communication termination endpoints of electronic messages sent at times respectively delayed relative to one another and inviting each of the communication termination endpoints to join a communication session. The system receives identification of associated communication termination endpoints that are to receive, at substantially the same time, electronic messages to join a communication session. The system determines and stores send time delays for each such communication termination endpoint that are calculated by a respectively appropriate method. Thereafter, when an electronic message is received requesting initiation of a communication session with one of the communication termination endpoints, the system uses the send time delays to respectively delay by an appropriate amount of time the sending of electronic invite messages to join the communication session to each of the communication termination endpoints.

17 Claims, 14 Drawing Sheets

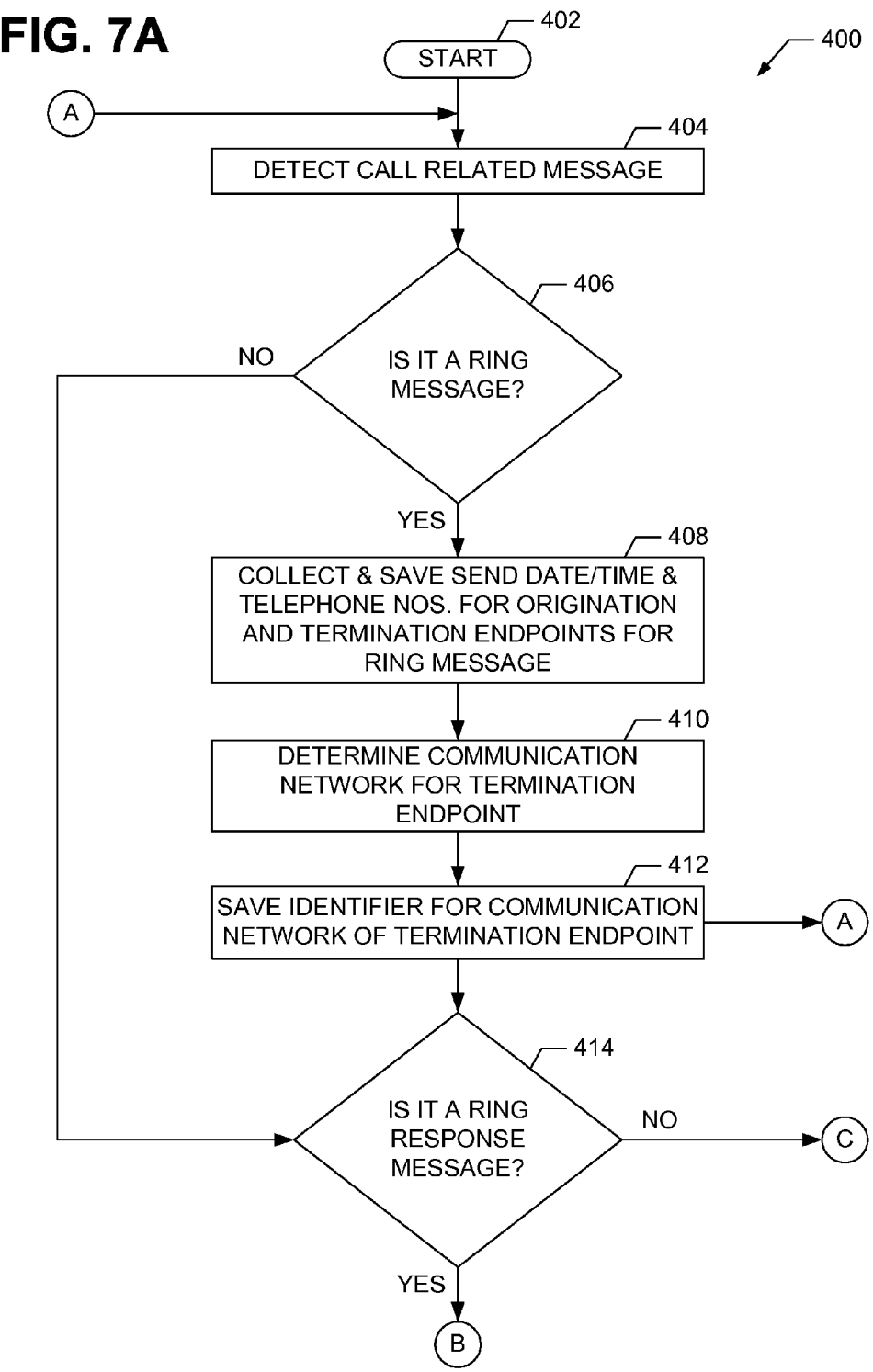

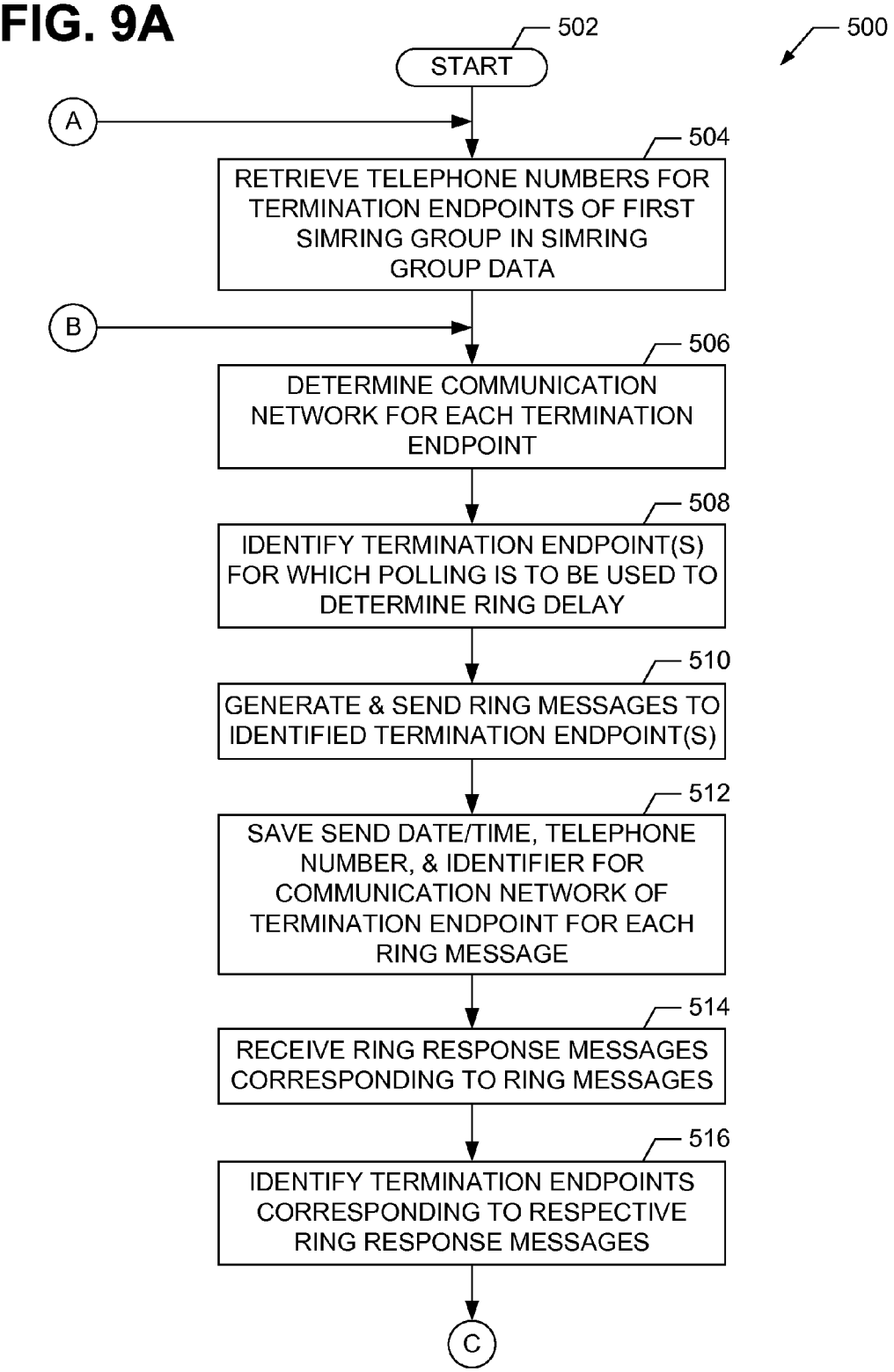

SYSTEM FOR SIMULTANEOUS DELIVERY OF COMMUNICATION SESSION INVITATION MESSAGES TO COMMUNICATION DEVICES

FIELD OF THE INVENTION

The present invention relates, generally, to the field of telecommunications systems, including apparatuses and methods for establishing communication sessions.

BACKGROUND

Many of today's communication service providers offer telephone services to subscribers with a feature commonly known as "simultaneous ringing". Using this feature, a subscriber may associate one or more secondary telephone numbers with a primary telephone number. Thereafter, an incoming telephone call directed to the primary telephone number will cause the telephones, personal communication devices, and/or other devices associated with the primary and secondary telephone numbers to ring, supposedly, in a simultaneous manner. By supposedly causing the telephones, personal communication devices, and/or other devices to ring simultaneously, the possibility of the subscriber missing the incoming telephone call is reduced as long as the subscriber is near one of the telephones, personal communication devices, and/or other devices associated with the primary and secondary telephone numbers. Also, because the telephones, personal communication devices, and/or other devices associated with the secondary telephone numbers are caused to ring, the caller placing the incoming telephone call need not place more than one telephone call to different telephone numbers in attempting to reach the subscriber.

Often, however, the telephones, personal communication devices, and/or other devices associated with the primary and secondary telephone numbers do not actually ring simultaneously. Typically, such non-simultaneous ringing occurs due to the telephones, personal communication devices, and/or other devices associated with the primary and secondary telephone numbers being accessible through different communication networks having different response times. For example, if a primary telephone number corresponds to a first telephone accessible through a first communication network having a first response time, a first secondary telephone number corresponds to a second telephone accessible through a second communication network having a second response time, and a second secondary telephone number corresponds to a personal communication device accessible through a third communication network having a third response time, the first and second telephones and the personal communication device may not ring simultaneously due to the first, second and third response times of the first, second and third communication networks being, respectively, different. Moreover, the first telephone may ring before the second telephone and the second telephone may ring before the personal communication device rings.

Therefore, there is a need in the industry for apparatuses and methods for implementing a simultaneous ringing feature that causes telephones, personal communication devices, and/or other devices associated with primary and secondary telephone numbers to actually ring simultaneously or in a near simultaneous manner, and that may address other problems, difficulties, and/or shortcomings of current technology that may or may not be described herein.

SUMMARY

Broadly described, the present invention comprises a system, including apparatuses and methods, for causing the simultaneous or near simultaneous receipt by multiple pre-identified communication termination endpoints of electronic messages sent at times respectively delayed relative to one another and inviting each of the communication termination endpoints to join a communication session. According to the embodiment described herein for example and not limitation in connection with a communication session comprising a telephone call, the system receives identification of associated communication termination endpoints that are to receive, at substantially the same time, electronic messages to join a communication session. The system determines and stores send time delays for each such communication termination endpoint that are calculated by a method appropriate for each such communication termination endpoint. Thereafter, when an electronic message is received requesting initiation of a communication session with one of the communication termination endpoints designated as the primary communication termination endpoint, the system uses the send time delays to respectively delay the sending of electronic invite messages to join the communication session to each of the communication termination endpoints by an appropriate amount of time, thereby causing the substantially simultaneous receipt of the electronic invite messages by all of the communication termination endpoints.

Advantageously, the system enables telecommunications service providers to provide simultaneous ring services to subscribers for such services that actually deliver nearly simultaneous, if not truly simultaneous, ringing of a subscriber's pre-identified communication devices. To do so, the system accounts for communication delays due to various communication networks that service the communication devices. By accounting for such communication delays and actually causing the simultaneous, or nearly simultaneous, ringing of a group of communication devices, the system constitutes a significant improvement over existing simultaneous ring systems.

Other advantages and benefits of the present invention will become apparent upon reading and understanding the present specification when taken in conjunction with the appended drawings.

BRIEF DESCRIPTION OF THE DRAWINGS

FIGS. 7A-7B display a flowchart representation of a data collection method of the simultaneous ring system in accordance with the example embodiment.

FIGS. 9A-9B display a flowchart representation of a polling response time estimating method of the simultaneous ring system in accordance with the example embodiment.

DETAILED DESCRIPTION OF THE DRAWINGS

Figure 1:
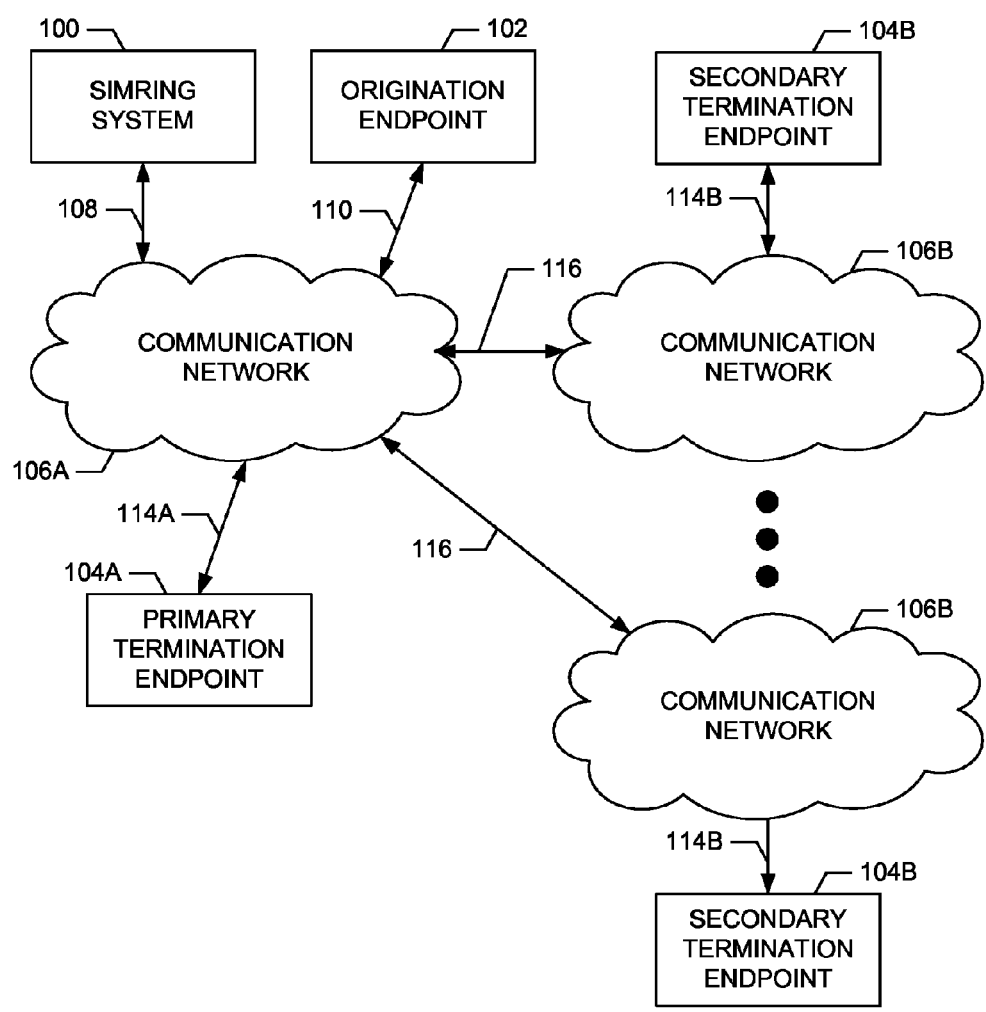
FIG. 1 displays a block diagram representation of a simultaneous ring system and environment therefor in accordance with an example embodiment of the present invention.

Referring now to the drawings in which like numerals represent like elements or steps throughout the several views, FIG. 1 displays a block diagram representation of a simultaneous ring system 100 and environment therefor in accordance with an example embodiment of the present invention. The simultaneous ring system 100 (also sometimes referred to herein as "simring system 100") is, generally, used and implemented by a telecommunications service provider (such as, but not limited to, a wired and/or wireless communications services provider) to enable the service provider to provide, and the service provider's subscribers to receive, simultaneous ring communication services.

During operation of the simring system 100 and in response to receiving a message and/or signals from an origination communication endpoint 102 requesting initiation of a communication session with a communication termination endpoint 104A, the simring system 100 communicates appropriate call invitation, or "ring", messages and/or signals to a communication termination endpoint 104A (sometimes referred to herein as "primary termination endpoint 104A") and one or more pre-identified other communication termination endpoints 104B (sometimes referred to herein as "secondary termination endpoints 104B") such that each communication termination endpoint 104 receives the simring system's ring messages and/or signals at substantially the same time. The call invitation, or "invite", messages invite the receiving communication termination endpoints 104 (often referred to herein as "termination endpoints 104") to join the corresponding communication session. Collectively, the primary and secondary termination endpoints 104A, 104B comprise a simring group. To accomplish receipt of the simring system's ring messages and/or signals by all communication termination endpoints 104 of a simring group at substantially the same time, each ring message and/or signal is, generally and automatically, sent by the simring system 100 at a different time relative to the other ring messages and/or signals in order to account for communication delays (sometimes referred to herein as "ring delays") encountered in the various communication networks 106 to which the simring system 100, origination communication endpoint 102, and communication termination endpoints 104 are respectively connected. The time delays automatically determined and imposed by the simring system 100 for the sending of a ring message and/or signals to the primary termination endpoint 104A and the sending of respective other ring messages and/or signals to the secondary termination endpoints 104B are referred to herein as "send delays".

As used herein, the term "origination communication endpoint 102" (often referred to herein as "origination endpoint 102") refers to a communication device initiating a communication session for the communication of data and/or signals that may correspond to video, audio, or other data and/or signals. "Termination endpoint 104" refers to a communication device to and/or with which a communication session for the communication of data and/or signals that may correspond to video, audio, or other data and/or signals is initiated by an origination endpoint 102. The term "communication network 106" refers to infrastructure, including apparatuses and methods, operative and utilized to communicate data and/or signals between (i) an origination endpoint 102 and one or more termination endpoints 104, (ii) the simring system 100 and one or more termination endpoints 104, and/or (iii) two or more other communication networks 106. "Communication device" refers to wired and/or wireless telephones, personal communication devices, personal digital assistants, computers, and other devices that are capable of communicating audio, video, and/or other data and/or signals corresponding thereto. The term "communication session" refers to a communicative linking of an origination endpoint 102 and one or more termination endpoints 104 for a period of time during which audio, video, and/or other data and/or signals are communicated therebetween. "Communication address" refers to an identifier uniquely identifying a particular communication termination endpoint from all other communication termination endpoints and that may be used in various messages and/or signals described herein. Thus, for example, origination endpoints 102 and termination endpoints 104 may include, without limitation, wired and wireless telephones, personal communication devices, personal digital assistants, computers, and other devices available now or in the future. Communication addresses may include, but not be limited to, telephone numbers, Internet Protocol (IP) addresses, and other identifiers that may be used, now or in the future, to uniquely identify particular origination endpoints 102 and termination endpoints 104. Similarly, for example and not limitation, communication networks 106 may include current and future wired and/or wireless communication infrastructure for communicating video, audio, or other data and/or signals such as the public switched telephone communication network, cable and/or satellite telecommunications service provider communication networks, other service provider communication networks, and the Internet. Therefore, the simring system 100 may be utilized, absent limitation, to provide simultaneous ring communication services in connection with the initiation of telephone calls (telephonic communication sessions), audio conferences, video conferences, video and audio conferences, video streaming communication sessions, and other communication sessions in which messages and/or signals initiating such sessions are to be received by primary and secondary termination endpoints 104A, 104B at substantially the same time.

For convenience of description and in accordance with the example embodiment described herein, but without limitation, the origination and termination endpoints 102, 104 comprise telephonic communication devices configured for communicating audio data and/or signals representative of speech or other sounds therebetween via one or more communication networks 106 during a communication session constituting a telephone call. Similarly, communication networks 106 comprise the public switched telephone communication network and other communication networks adapted to communicate such audio data and/or signals. Further, primary termination endpoint 104A and secondary termination endpoints 104B each have a respective communication address in the form of a telephone number assigned thereto and associated therewith by their respective telecommunications service providers uniquely identifying the primary and secondary termination endpoints 104A, 104B.

The simring system 100, as displayed in FIG. 1, is connected to communication network 106A by communication link 108 for the bi-directional communication of messages, information, data, and/or signals with the communication network 106A. Origination endpoint 102 is similarly connected to communication network 106A for the bi-directional communication of messages, information, data, and/or signals therewith by communication link 110. Origination endpoint 102 is configured to generate and send a call initiation message and/or signals, or cause the generation and sending thereof, to the simring system 100 indicating that origination endpoint 102 desires to establish a telephonic communication session with primary termination endpoint 104A. The primary termination endpoint 104A is identified to the simring system 100 by the communication of the communication address (according to the example embodiment, the telephone number) of the primary termination endpoint 104A with the call initiation message and/or signals.

Termination endpoints 104 are, according to the example embodiment, connected to various communication networks 106 by respective communication links 114. Messages, information, data, and/or signals are communicated bi-directionally between the termination endpoints 104 and the communication networks 106, as appropriate, via the communication links 114. More particularly, primary termination endpoint 104A is connected to communication network 106A by communication link 114A and secondary termination endpoints 104B are connected to communication networks 106B by communication links 114B. Communication network 106A is connected to communication networks 106B by respective communication links 116 for bi-directional communication of messages, information, data, and/or signals therebetween. Generally, communication links 116 comprise infrastructure providing communication paths such as, for example and not limitation, wired and/or wireless communication paths. However, in some cases, communication links 116 may further include intermediate communication networks not shown in FIG. 1, but which may create delay in the communication of messages, information, data, and/or signals between the simring system 100 and termination endpoints 104B in addition to delays caused by the communication networks 106 that directly service the simring system 100 and respective termination endpoints 104.

Termination endpoints 104 may be of the same or different types, be provided by the same or different manufacturers, and support the same or different technologies. Similarly, communication networks 106 may support the same or different communication technologies. As a consequence, certain termination endpoints 104 and certain communication networks 106 may have certain capabilities and communication delays that other termination endpoints 104 and communication networks 106 do not have and, for at least this reason and as described in more detail below, different methods may need to be employed to determine the ring delays between the simring system 100 and the termination endpoints 104. For example, some termination endpoints 104 and communication networks 106 may support session initiation protocol (SIP) over Internet protocol (IP) with such termination endpoints 104 being configured to receive SIP request messages (e.g., ring messages) and return SIP response messages (e.g., ring response messages). Other termination endpoints 104 and communication networks 106 may, for example, support Integrated Services Digital Network (ISDN) communications with such termination endpoints 104 being adapted to receive and return various ISDN User Part (ISUP) messages corresponding to ring and/or ring response messages. Regardless, however, each termination endpoint 104 is, generally, adapted to receive ring messages and/or signals from the simring system 100.

Figure 2:
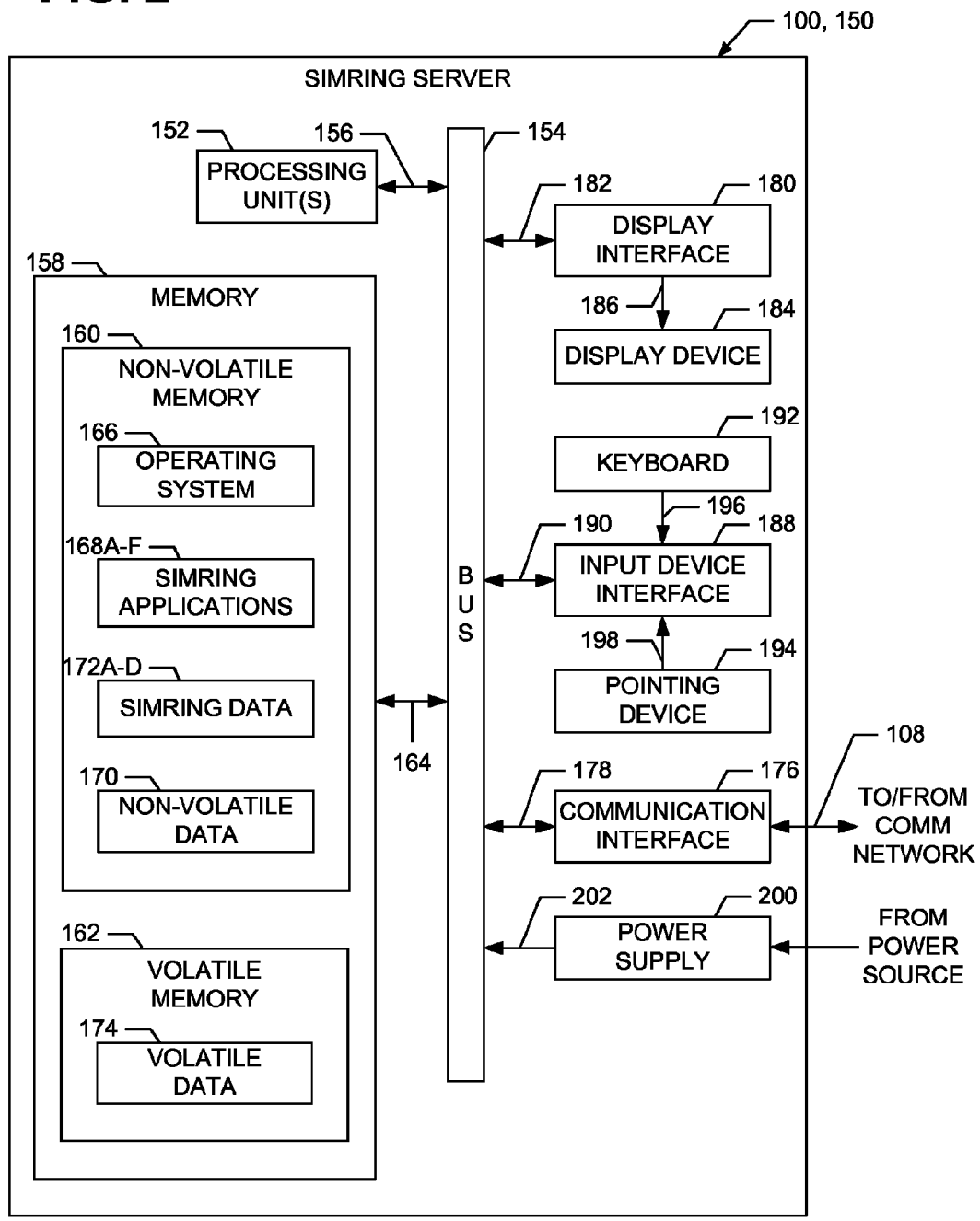
FIG. 2 displays a block diagram representation of a simultaneous ring server of the simultaneous ring system in accordance with the example embodiment.

FIG. 2 displays a block diagram representation of a simultaneous ring server 150 of the simring system 100 in accordance with the example embodiment. The simultaneous ring server 150 (often referred to herein as the "simring server 150") is configured to, and in operation does, receive and store one or more telephone numbers associated, respectively, with one or more secondary termination endpoints 104B and linked to a telephone number of a primary termination endpoint 104A. Thereafter, whenever the simring server 150 receives a call initiation message and/or signals indicating that an origination endpoint 102 desires to establish a communication session with the primary termination endpoint 104A, the simring server 150 automatically generates and communicates appropriate ring messages and/or signals to each of the primary and secondary termination endpoints 104A, 104B of the simring group, via communication networks 106, at appropriate times so as to cause each of the primary and secondary termination endpoints 104A, 104B to ring at substantially the same time. The times at which the various ring messages are sent to the primary and secondary termination endpoints 104A, 104B are based on send delays that are automatically estimated and stored by the simring server 150, as the case may be, for each termination endpoint 104 or for the communication networks 106 which respectively service the termination endpoints 104. The send delays are based on ring delays that are automatically estimated by the simring server 150 for the termination endpoints 104 and/or for the communication networks 106 which respectively service the termination endpoints 104. In an alternate embodiment, the ring and/or send delays may be received from or edited by a user of the simring system 100 via an appropriate user interface.

The simring server 150 comprises one or more processing unit(s) 152 adapted to execute computer software instructions of an operating system 166 and other computer software as required to provide the functionality described herein. The processing unit(s) 152 may include, but not be limited to, microprocessors or other similar components. Each processing unit 152 is connected to a bus 154 by bi-directional communication paths 156 for the bi-directional communication of address, data and control signals with the bus 154. The bus 154 includes a plurality of address, data and control electrical signal paths as appropriate to communicate address, data and control electrical signals between the various components of the simring server 150.

The simring server 150 further comprises a memory 158, including non-volatile memory 160 and volatile memory 162. The memory 158 is communicatively connected to bus 154 for the bi-directional communication of computer software instructions, addresses, data and control signals with the bus 154 and other components connected to the bus 154, through one or more bi-directional communication paths 164. Non-volatile memory 160 generally stores information and/or data that will not be lost when electrical power to the non-volatile memory 160 is removed. Examples of non-volatile memory include, without limitation, flash random access memory devices, battery backed up random access devices, read only memory devices, programmable read only memory devices, electrically programmable read only memory devices, magnetic disks, optical disks, and other similar or non-similar devices available now or in the future. Volatile memory 162 typically stores information and/or data for a temporary period of time, as such information and/or data that will be lost when electrical power is no longer supplied to the volatile memory 162. Examples of volatile memory include, but are not limited to, non-battery backed up random access memory devices.

In accordance with the example embodiment, non-volatile memory 160 stores a plurality of computer software instructions of an operating system 166 that, when delivered to and executed by a processing unit 152, enable the processing unit 152 and other simring server components to perform various actions and provide the basic functionality necessary to implement the methods described herein. Non-volatile memory 160 also stores computer software instructions of a plurality of simring applications 168A-F, which when communicated to and executed by a processing unit 152, cause the simring server 150 to operate according to the simring applications 168A-F, thereby implementing, as the case may be, the methods and functions of the simring applications 168A-F described in more detail below. Additionally, non-volatile memory 160 stores non-volatile data 170 that is used by a processing unit 152 during execution of the computer software instructions of the operating system 166 and simring applications 168A-F.

More particularly, the simring applications 168A-F comprise a user interface application 168A for receiving and associating telephone numbers with primary and secondary termination endpoints 104A, 104B and for associating the telephone numbers and termination endpoints 104 in a simring group. The simring applications 168A-F also comprise a data collection application 168B for monitoring and collecting data associated with ring messages, ring response messages, and answer response messages for telephone calls originating at a communication network 106A of a simring services provider. Additionally, simring applications 168A-F include polling and non-polling response time estimating applications 168C, 168D for automatically determining estimates of ring response times and answer response times, as appropriate, for termination endpoints 104 serviced by communication networks 106. Generally and according to the example embodiment, the simring system 100 utilizes the polling response time estimating application 168C to actively poll termination endpoints 104 and automatically determine estimates of ring response times for termination endpoints 104 that support polling and that receive telecommunications services from a communication network 106 that supports polling. Polling provides the most granular ring response time estimation and, therefore, polling is the preferred method for determining ring response time (and, hence, ring delay) estimations. For those termination endpoints 104 and/or communication networks 106 that do not support polling but accurately send ring response messages to received ring messages, the simring system 100 utilizes the non-polling response time estimating application 168D to produce estimates of ring response times based on collected call data 172C. For those termination endpoints 104 and/or communication networks 106 that do not support polling and do not accurately send ring response messages, the simring system 100 utilizes the non-polling response time estimating application 168D to produce estimates of answer response times based on collected call data 172C. Regardless of which application 168C, 168D is employed to estimate the ring and/or answer response time for a termination endpoint 104, the simring system 100 may also employ test termination endpoints to validate the ring and/or answer response time.

In addition, the simring applications 168A-F comprise a ring/send delay estimating application 168E that automatically generates estimated ring and send delays for termination endpoints 104 based at least on and as appropriate, the ring and/or answer response time estimates for the termination endpoints 104 produced by the polling and non-polling response time estimating applications 168C, 168D. Further, the simring applications 168A-F comprise a call processing application 168F for utilizing the estimated send delays previously determined by the ring/send delay estimating application 168E to provide simring services to subscribers. More specifically, the call processing application 168F receives call initiation messages from origination endpoints 102 and, in response, generates and communicates ring messages to primary and secondary termination endpoints 104A, 104B of simring groups using respective send delays retrieved from simring group data 172A. By using pre-determined send delays retrieved from simring group data 172A and not calculating send delays at run time, undesirable call processing delays are not introduced by the simring system 100.

It should be appreciated that in accordance with an alternate embodiment, the user interface application 168A may permit a subscriber to individually adjust the automatically determined send delays for termination endpoints 104 so as to cause the simring system 100 to communicate ring messages to certain termination endpoints 104 using more or less time delay than that determined through operation of simring applications 168B-E. It should also be appreciated that although the estimation of ring and send delays is described herein as being performed via operation of the simring applications 168B-E, such estimation may be performed in alternate embodiments by other application(s).

Additionally and as described in more detail below, non-volatile memory 160 stores simring data 172A-D that is received or generated by the simring system 100 and that is used to provide simring services to simring services subscribers. According to the example embodiment, simring data 172A-D comprises simring group data 172A (also sometimes referred to herein as "group data 172A") which identifies and associates the termination endpoints 104 for each simring group at least by virtue of the receipt of telephone numbers for the termination endpoints 104 from a subscriber via the user interface application 168A. The simring group data 172A also includes ring and send delays that are determined and stored for the termination endpoints 104. The send delays are used by the call processing application 168F, upon receipt of a call initiation message intended for a primary termination endpoint 104A of a simring group, to generate and send ring messages to each of the termination endpoints 104 of the simring group at times appropriate to cause all of the termination endpoints 104 to receive the simring messages at substantially the same time.

Simring data 172A-D also comprises simring communication network data 172B (also sometimes referred to herein as "network data 172B") for a plurality of communication networks 106 that provide telecommunications services to termination endpoints 104. For each communication network 106, the simring communication network data 172B identifies a particular method to be used for estimating ring delays for termination endpoints 104 that receive telecommunications services from the communication network 106. The simring communication network data 172B for each communication network 106 also includes an average ring response time or an average answer response time for the communication network 106 as determined by the simring system's non-polling response time estimating application 168C and used as the average ring or answer response time for termination endpoints 104 serviced by the communication network 106.

In addition, simring data 172A-D comprises simring call data 172C (also sometimes referred to herein as "call data 172C") obtained by the simring system's monitoring of telephone calls placed from origination endpoints 102 that receive telecommunications services from the communication network 106A of the simring system 100. More particularly, the simring system's data collection application 168B monitors ring messages, ring response messages, and answer response messages exchanged between such origination endpoints 102 and termination endpoints 104 in connection with telephone calls therebetween and collects data for each telephone call. The simring call data 172C includes a ring message send date/time, a ring response message receive date/time, and an answer response message receive date/time for each telephone call. The ring message send date/time, a ring response message receive date/time, and an answer response message receive date/time for each telephone call are used by the poll and non-poll response time estimating applications 168C, 168D, as appropriate, to generate respective ring and/or answer response times that are stored as part of the simring call data 172C for the telephone call.

Further, simring data 172A-D comprises simring network cross-reference data 172D (also sometimes referred to herein as "network cross-reference data 172D") that identifies communication networks 106 in which termination endpoints 104 reside or from which termination endpoints 104 directly receive telecommunications services. The simring network cross-reference data 172D is used by the simring system's applications 168A-F to determine, via look up, which communication network 106 provides telecommunications services to a particular termination endpoint 104 then being considered. It should be appreciated that the simring network cross-reference data 172D may, in an alternate embodiment, not be part of the simring system 100, but instead be part of the simring system's environment relied upon and used by the simring system 100 to provide simring services. It should also be appreciated that while the simring data 172A-D is described herein as being stored by non-volatile memory 160 of the simring server 150, the simring data 172A-D may be stored at one or more other locations (such as, for example and not limitation, one or more network accessible storage device(s)) and may be stored in one or more data files, data tables, and/or databases.

Volatile memory 162 stores volatile data 174 that is created and/or used by the operating system 166 and/or the simring applications 168A-F during execution. Volatile data 174 may include, for example and not limitation, simring data 172A-D retrieved from non-volatile memory 160, call initiation messages received origination endpoints 102, ring messages generated for communication to termination endpoints 104, ring and/or answer response messages received from termination endpoints 104, and intermediate data produced by execution of the operating system 166 and/or simring applications 168A-F.

The simring server 150 also comprises one or more communication interface(s) 176 that connect to bus 154 via respective communication paths 178 for the bi-directional communication of address, data and control signals therebetween. The communication interface(s) 176 connects the simring server 150 with communication network 106A via communication link 108 for the bi-directional communication of messages, information, data, and/or signals with origination endpoints 102, termination endpoints 104, and other communication networks 106B.

In accordance with the example embodiment and as displayed in FIG. 2, the simring server 150 additionally comprises a display interface 180 connected to bus 154 via communication path 182 for the bi-directional communication of addresses, data and/or control signals with the bus 152 and various components connected to the bus 152. A display device 184 is connected to the display interface 180 via communication path 186 for the receipt and display of video or image signals received from the display interface 180. Similarly, an input device interface 188 is connected to bus 154 via communication path 190 for the bi-directional communication of addresses, data and/or control signals with the bus 154 and various components connected to the bus 154. A keyboard 192 and pointing device 194 are, respectively, connected to the input device interface 188 via respective communication paths 196, 198 for the receipt of input from an administrator of the simring server 150 and for the communication of data representative of such input to the input device interface 188. A power supply 200 is connected to bus 154 via electrical signal path 202 to supply electrical energy to the bus 154 and components connected to the bus 154 that is necessary for their operation.

Figure 3:
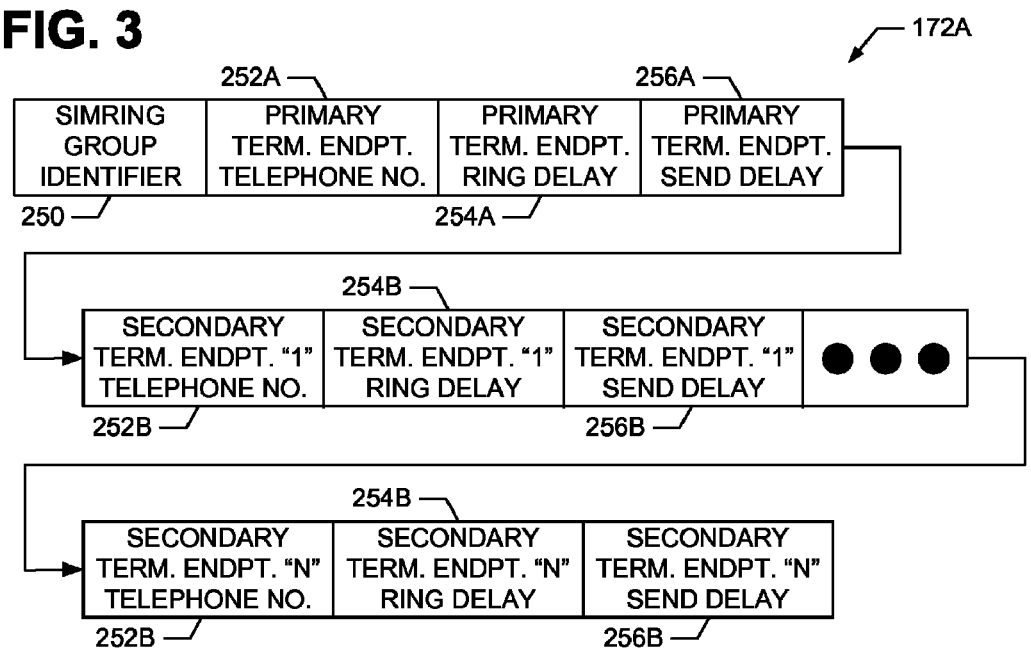
FIG. 3 displays a schematic representation of group data of the simultaneous ring system in accordance with the example embodiment.

FIG. 3 displays a schematic representation of simring group data 172A, in accordance with the example embodiment, that is created, maintained, and/or updated for each simring group by the user interface application 168A and the ring/send delay estimating application 168E. The group data 172A defines and identifies a plurality of simring groups that are created in response to information and/or data input by simring services subscribers via the user interface application 168A. As described briefly above, each simring group includes a primary termination endpoint 104 and one or more associated secondary termination endpoints 104B. The primary and second termination endpoints 104A, 104B are identified by respective telephone numbers input by the subscriber to which the simring group belongs. The telephone numbers of the group data 172A may be updated by simring services subscribers, as desired, through the subscribers' use of the user interface application 168A. The respective ring and send delays for each termination endpoint 104 are calculated and updated by the ring/send delay estimating application 168E.

The group data 172A for each simring group includes a simring group identifier 250 that is associated with, corresponds to, and uniquely identifies the simring group on a one-to-one basis throughout the simring system 100. The simring group identifier 250 is assigned to the simring group by the user interface application 168A and may comprise a number, character string, or mixture of numbers and characters, but must be unique within the group data 172A. For each simring group, the group data 172A also includes a primary termination endpoint telephone number 252A, a primary termination endpoint ring delay 254A, and a primary termination endpoint send delay 256A. The primary termination endpoint telephone number 252A comprises a telephone number for the simring group's primary termination endpoint 104A assigned by the telecommunications services provider that is providing telecommunications and simring services to the simring services subscriber. The primary termination endpoint ring delay 254A comprises the amount of time between (i) the communication of a ring message to the primary termination endpoint 104A in response to a call initiation message sent by an origination endpoint 102 and (ii) the receipt of a corresponding ring response message from the primary termination endpoint 104A. The primary termination endpoint send delay 256A comprises the amount of time that the simring system 100 should delay prior to sending a ring message to the primary termination endpoint 104A in response to a call initiation message received for the primary termination endpoint 104A from an origination endpoint 102 and in order to cause ring messages to be received by the termination endpoints 104 of the simring group at substantially the same time.

For each secondary termination endpoint 104B that is part of a simring group, the group data 172A includes a secondary termination endpoint telephone number 252B, a secondary termination endpoint ring delay 254B, and a secondary termination endpoint send delay 256B. The secondary termination endpoint telephone number 252B comprises a telephone number for the secondary termination endpoint 104B that is assigned by the telecommunications service provider that is providing telecommunications services for the secondary termination endpoint 104B. The secondary termination endpoint ring delay 254B comprises the amount of time between (i) the communication of a ring message to the secondary termination endpoint 104B and (ii) the receipt of a corresponding ring response message from the secondary termination endpoint 104B. The secondary termination endpoint send delay 256B comprises the amount of time that the simring system 100 should delay prior to sending a ring message to the secondary termination endpoint 104B in response to a call initiation message for the primary termination endpoint 104A received from an origination endpoint 102 and in order to cause ring messages to be received by the termination endpoints 104 of the simring group at substantially the same time.

Figure 4:
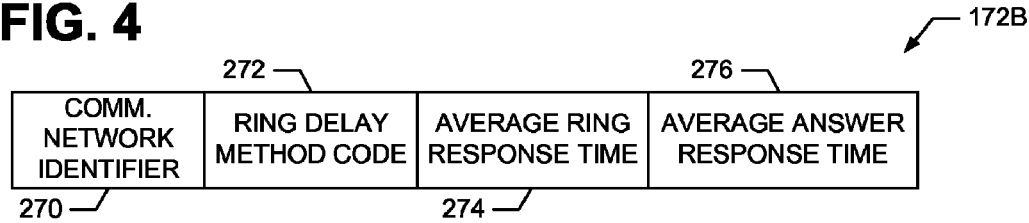
FIG. 4 displays a schematic representation of communication network data of the simultaneous ring system in accordance with the example embodiment.

FIG. 4 displays a schematic representation of simring communication network data 172B, according to the example embodiment, that is created and/or maintained for each communication network 106 that provides telecommunications services to termination endpoints 104. For each communication network 106, the network data 172B includes a communication network identifier 270 that is associated with, corresponds to, and uniquely identifies the communication network 106 on a one-to-one basis throughout the simring system 100. The communication network identifier 270 may comprise a number, character string, or mixture of numbers and characters, but must be unique within the simring system 100.

The network data 172B also includes, for each communication network 106, a ring delay method code 272 uniquely identifying a method appropriate for and/or supported by the communication network 106 that is to be used by the simring system 100 to determine an estimate of ring delay for termination endpoints 104 that receive telecommunications services directly from the communication network 106. In accordance with the example embodiment, the ring delay method code 272 for a particular communication network 106 may have a first value indicating that the polling method be used to determine an estimate of ring delay, a second value indicating that the ring response method be used to determine an estimate of ring delay, or a third value indicating that the answer response method be used to determine an estimate of ring delay. If use of the polling method is indicated by the ring delay method code 272, the simring system 100 (i) determines a separate, individual estimate of ring delay for each termination endpoint 104 receiving telecommunications services from the communication network 106 and identified as part of a simring group and (ii) stores the ring delay estimate in group data 172A as the primary termination endpoint ring delay 254A or as a secondary termination endpoint ring delay 254B, as the case may be, for the termination endpoint 104. If use of the ring or answer response methods is indicated by the ring delay method code 272, the simring system 100 (i) determines an estimate of ring delay for the communication network 106 (and not individually for each termination endpoint 104) using the indicated method and (ii) stores the ring delay estimate in group data 172A for each termination endpoint 104 as the primary termination endpoint ring delay 254A or as a secondary termination endpoint ring delay 254B, as the case may be, for the termination endpoint 104 as if the ring delay had been determined individually for the termination endpoint 104.

Additionally for each communication network 106, the network data 172B includes an average ring response time 274 or an average answer response time 276. The average ring response time 274 and average answer response time 276 are determined by the simring system 100 for those communication networks 106 for which the ring delay method code 272 indicates that either the ring response method or answer response method is to be used in determining ring delay for termination endpoints 104 respectively receiving telecommunications services directly from such communication networks 106.

Figure 5:
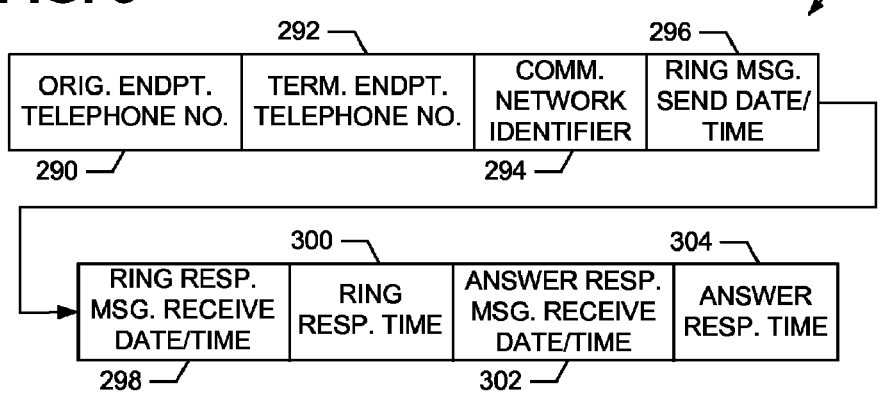
FIG. 5 displays a schematic representation of call data of the simultaneous ring system in accordance with the example embodiment.

FIG. 5 displays a schematic representation, in accordance with the example embodiment, of simring call data 172C for each telephone call initiated (i) by an origination endpoint 102 receiving telecommunications services from communication network 106A and monitored by the simring system 100 or (ii) by the simring system 100 during polling of a termination endpoint 104. Call data 172C is initially generated for each such telephone call from or in connection with the ring message, ring response message, and answer response message that are sent or received, as the case may be, by communication network 106A for the telephone call. Subsequently, the ring response times and answer response times are calculated and stored in the call data 172C for the telephone call.

More specifically and for each telephone call, the call data 172C comprises an origination endpoint telephone number 290, a termination endpoint telephone number 292, and a communication network identifier 294. The origination endpoint telephone number 290 is a telephone number for the call's origination endpoint 102 that is assigned by the telecommunications services provider that is providing telecommunications and simring services to the origination endpoint 102. The termination endpoint telephone number 292 is a telephone number for the call's termination endpoint 104 assigned by the telecommunications services provider that is providing telecommunications services to the termination endpoint 104. The communication network identifier 294 is associated with, corresponds to, and uniquely identifies the communication network 106 from which the termination endpoint 104 directly receives telecommunications services.

The call data 172C also comprises a ring message send date/time 296, ring response message receive data/time 298, and a ring response time 300 for the corresponding telephone call. The ring message send date/time 296 is the date and time on/at which the ring message for the telephone call is sent to the call's termination endpoint 104. The ring response message receive date/time 298 is the date and time on/at which the ring response message corresponding to the call's ring message is received from the call's termination endpoint 104. The ring response time 300 is the time difference calculated between the time at which the call's ring message is sent and the time at which the corresponding ring response message is received. The ring response time 300 is, according to the example embodiment, calculated and stored in call data 172C by the data collection application 168B or the polling response time estimating application 168D depending on whether the corresponding telephone call comprises a telephone call initiated by an actual origination endpoint 102 or by the polling response time estimating application 168D acting as a virtual origination endpoint 102 to determine a ring response time 300 for a termination endpoint 104 serviced by a communication network 106 that both support polling.

Additionally, for each telephone call, the call data 172C comprises an answer response message receive date/time 302 and an answer response time 304. The answer response message receive date/time 302 is the date and time on/at which the answer message corresponding to the call's ring message is received from the call's termination endpoint 104. The answer response time 304 is the time difference calculated between the time at which the call's ring message is sent and the time at which the corresponding answer response message is received. In accordance with the example embodiment, the answer response time 304 is calculated and stored in call data 172C by the data collection application 168B.

Figure 6:
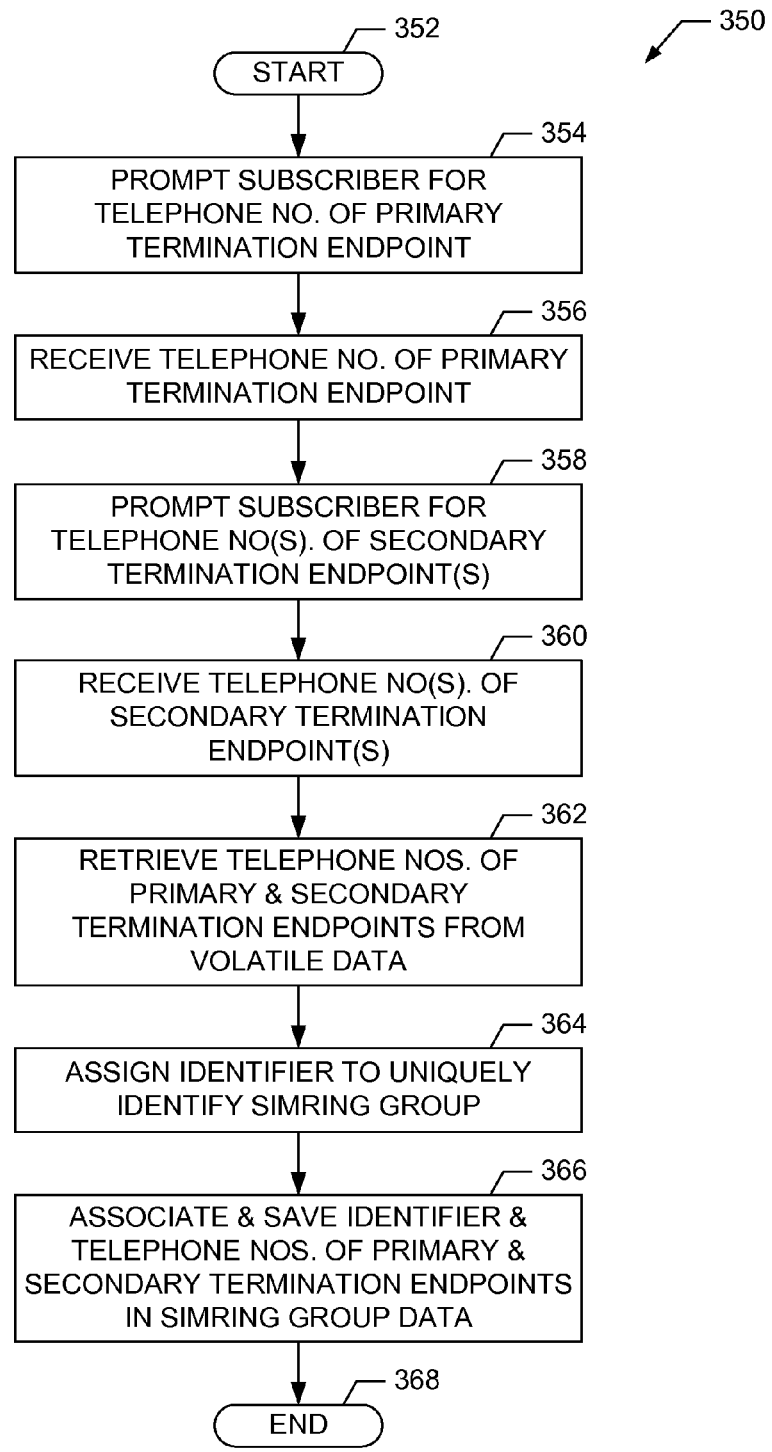
FIG. 6 displays a flowchart representation of a user interface method of the simultaneous ring system in accordance with the example embodiment.

FIG. 6 displays a flowchart representation of a user interface method 350 of the simring system 100 according to the example embodiment. The user interface method 350 is implemented by execution of the user interface application 168A by a processing unit 152 of the simring server 150. Through operation in accordance with the user interface method 350 (also sometimes referred to herein as "method 350"), the simring system 100 establishes respective simring groups for simring services subscribers and enables subscribers to later edit and/or change termination endpoints 104 that are part of their simring groups. According to the example embodiment, the user interface application 168A comprises an interactive voice response (IVR) application that is invoked by a simring services subscriber placing a telephone call to a pre-defined service provider telephone number. However, in accordance with an alternate embodiment, the user interface application 168A may comprise an Internet accessible application having a displayed user interface with which subscribers interact via a computer, personal communication device, personal digital assistant, or similar device to provide, and from which the simring system 100 receives, telephone numbers associated with primary and secondary termination endpoints 104A, 104B.

After invocation of the user interface application 168A by a subscriber and the start of execution of the user interface application 168A by a processing unit 152 at step 352 of method 350, the processing unit 152 causes the subscriber to be prompted for a telephone number corresponding to and associated with the primary termination endpoint 104A at step 354. In response to the prompt, the subscriber inputs the requested telephone number for the primary termination endpoint 104A via keystroke, voice, or other method from a device being used by the subscriber to interact with the user interface application 168A. At step 356, the processing unit 152 receives the input telephone number for the primary termination endpoint 104A and stores the received telephone number temporarily as volatile data 174.

Proceeding to step 358 of method 350, the processing unit 152 causes the subscriber to be prompted for a telephone number corresponding to and associated with each secondary termination endpoint 104B of the simring group for the primary termination endpoint 104A. The subscriber, responsive to the prompting, inputs the requested telephone number(s) for the secondary termination endpoint(s) 104B again via keystroke, voice, or other method appropriate for the device being used by the subscriber. Next, at step 360, the processing unit 152 receives the input telephone number(s) for the secondary termination endpoint(s) 104B and stores the received telephone number(s) temporarily as volatile data 174.

At step 362 of method 350, the processing unit 152 retrieves the input telephone numbers for the primary and secondary termination endpoints 104A, 104B from volatile data 174. The processing unit 152, at step 364, assigns a unique identifier to identify the simring group within the simring system 100. Then, at step 366, the processing unit 152 saves in simring group data 172A, the assigned identifier as the simring group identifier 250, the received telephone number for the primary termination endpoint 104A as the primary termination endpoint telephone number 252A, and the received telephone number(s) for the secondary termination endpoint(s) 104B as the secondary termination endpoint telephone number(s) 252B. In saving the assigned identifier and the telephone numbers for the primary and secondary termination endpoints 104A, 104B together, the processing unit 152 associates the telephone numbers and, hence, the corresponding primary and secondary termination endpoints 104A, 104B in a simring group. Subsequently, operation according to the user interface method 350 ends at step 368.

Figure 7B:
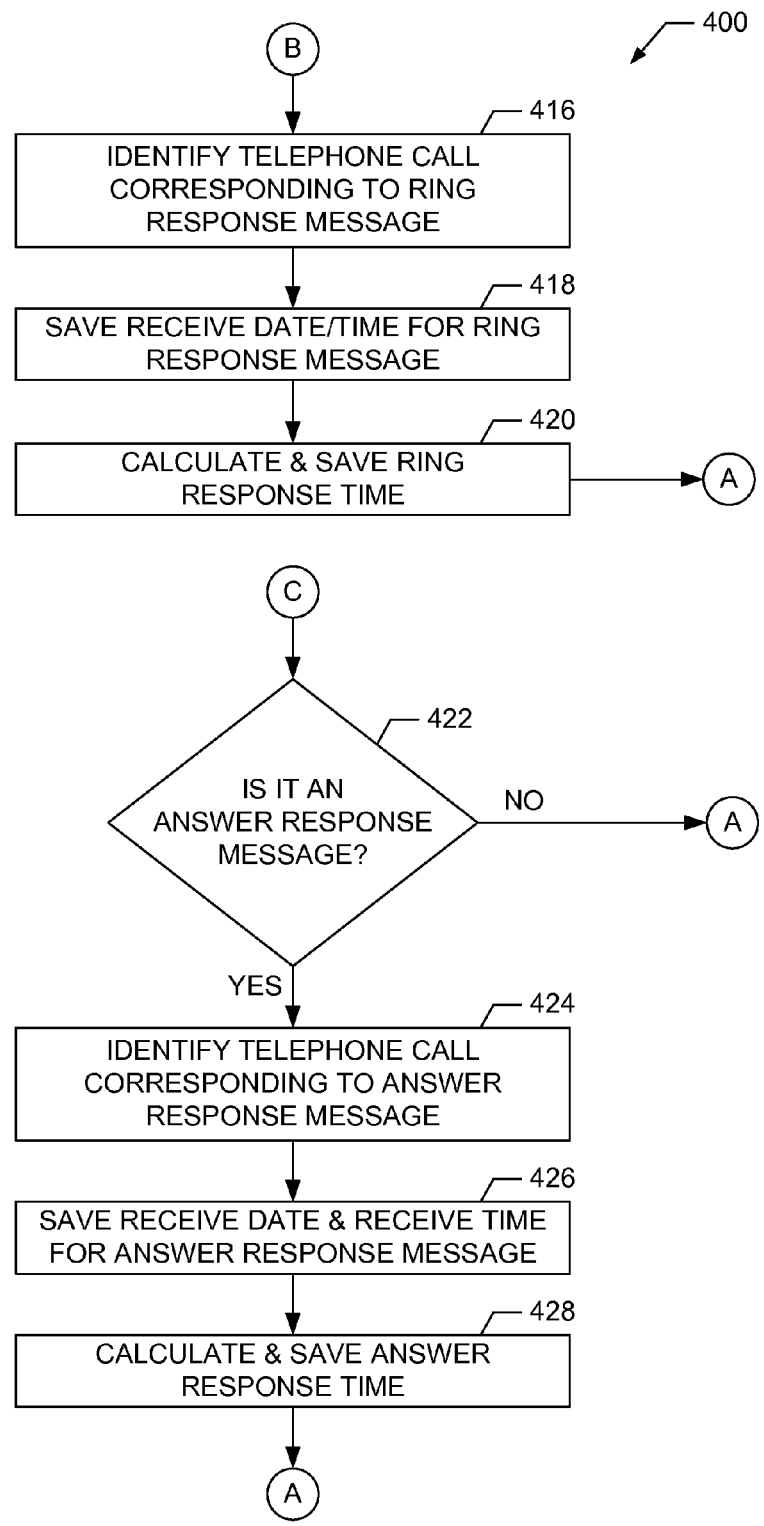

FIGS. 7A-7B display a flowchart representation of a data collection method 400 of the simring system 100 in accordance with the example embodiment. The data collection method 400 is implemented by execution of the data collection application 168B by a processing unit 152 of the simring system 100. Generally, the data collection application 168B is executed continually during operation of the simring server 150 (and, hence, of the simring system 100) and passively eavesdrops on ring, ring response, and answer response messages and/or signals being communicated in connection with telephone calls. Operating according to the data collection method 400 (also sometimes referred to herein as "method 400"), the simring system 100 monitors, collects, calculates, and stores call data 172C for telephone calls initiated by an origination endpoint 102 receiving telecommunications services from communication network 106A. The call data 172C is subsequently used by the simring system 100 to determine ring delays for communication networks 106 and termination endpoints 104 that do not support polling as a method of determining ring response time for the termination endpoints 104.

After beginning operation according to the data collection method 400 at step 402 thereof, the processing unit 152 advances to step 404 where the processing unit 152 detects a call related message being communicated by or to communication network 106A in connection with a telephone call initiated by an origination endpoint 102. Next, at step 406, the processing unit 152 determines whether the message constitutes a ring message. If not, the processing unit 152 branches ahead to step 414 of method 400 described below. Alternatively, if the message constitutes a ring message, the processing unit 152 collects and saves the telephone numbers for the origination and termination endpoints 102, 104 and the message's send date/time, respectively, as the origination endpoint telephone number 290, termination endpoint telephone number 292, and ring message send date/time 296 in call data 172C at step 408.

Continuing at step 410, the processing unit 152 determines which communication network 106 directly provides telecommunication services to the termination endpoint 104 corresponding to the termination endpoint telephone number 292 for the telephone call associated with the ring message. To do so, the processing unit 152 uses the termination endpoint telephone number 292, or portions thereof, to look up an identifier for such communication network 106 in network cross-reference data 172D. After obtaining the identifier, the processing unit 152 saves the identifier as communication network identifier 294 in the call data 172C for the telephone call at step 412. Subsequently, the processing unit 152 loops back to step 404 of method 400 to await detection of another call related message.

If, at step 406, the processing unit 152 determines that the detected call related message is not a ring message, the processing unit 152 decides whether the message comprises a ring response message at step 414. If the processing unit 152 decides that the message does not comprise a ring response message, the processing unit 152 advances to step 422 of method 400 described below. However, if the processing unit 152 decides that the message comprises a ring response message, the processing unit 152 identifies the telephone call to which the ring response message corresponds at step 416. To do so, the processing unit 152 compares data present in the ring response message to data already stored as call data 172C for telephone calls. After identifying the telephone call, the processing unit 152 saves the receive date/time for the ring response message, at step 418, as the ring response message receive date/time 298 for the telephone call in call data 172C. Then, at step 420, the processing unit 152 calculates and saves the ring response time for the telephone call as ring response time 300 in call data 172C. The ring response time is calculated by subtracting the ring message send time from the ring response message receive time. Once the ring response time has been saved in call data 172C for the telephone call, the processing unit 152 branches back to step 404 of method 400 to again await detection of a call related message.

At step 422 of method 400, the processing unit 152 ascertains whether the detected message corresponds to an answer response message. If not, the processing unit 152 returns to step 404 to await detection of a call related message. Alternatively, if the detected message corresponds to an answer message, then the processing unit 152 moves ahead to step 424 of method 400 where the processing unit 152 identifies the telephone call to which the answer response message pertains. To make such an identification, the processing unit 152 compares data present in the answer response message to data already stored as call data 172C for telephone calls. Once the corresponding telephone call has been identified, the processing unit 152, at step 426, saves the receive date/time for the answer response message as the answer response message receive date/time 302 for the telephone call in call data 172C. Next, at step 428, the processing unit 152 calculates and saves the answer response time for the telephone call as answer response time 304 in call data 172C. The answer response time is calculated by subtracting the ring message send time from the answer response message receive time. After saving the answer response time in call data 172C for the telephone call, the processing unit 152 loops back to step 404 of method 400 to again await detection of a call related message.

Figure 8A:
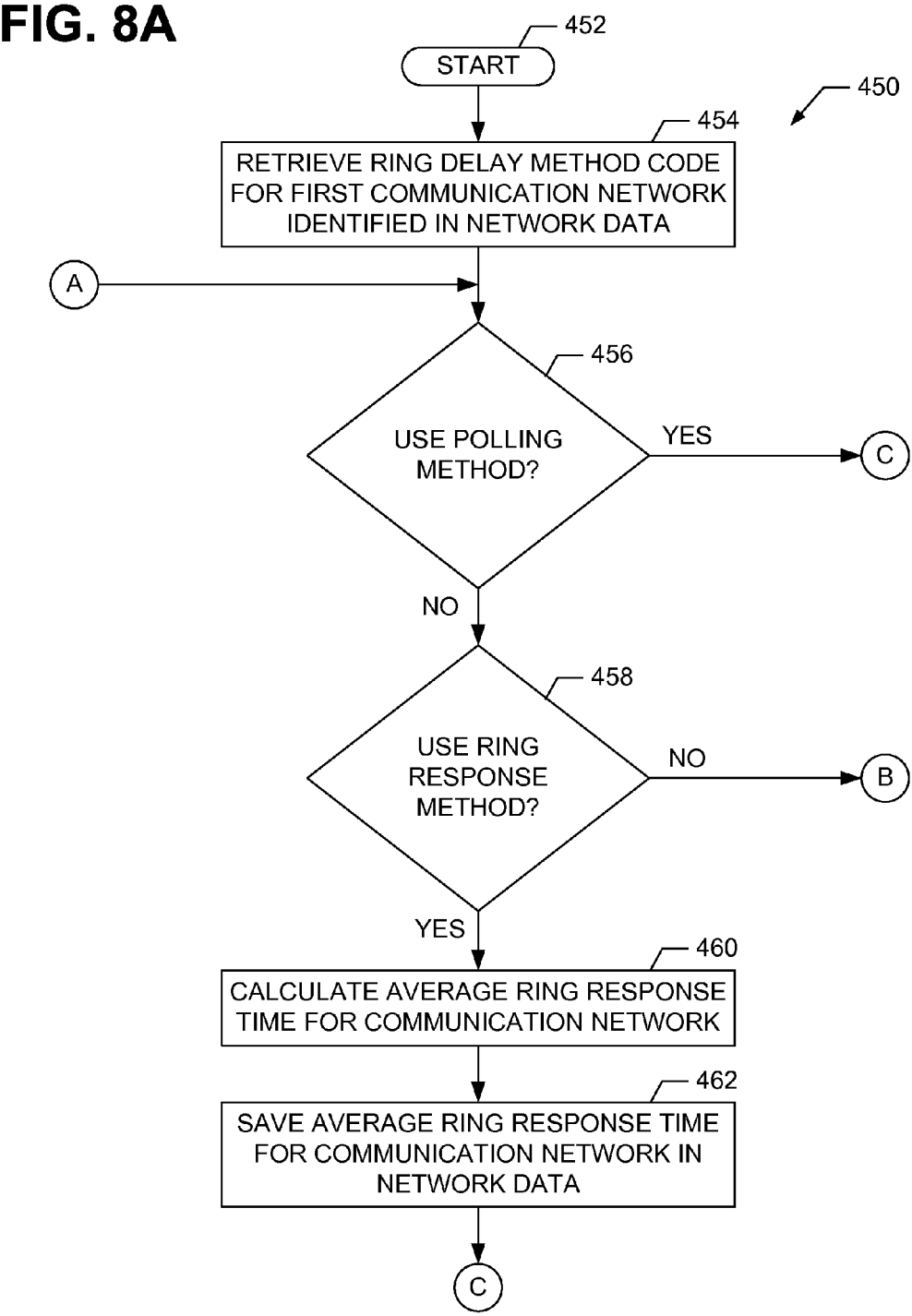
FIG. 8 displays a flowchart representation of a non-polling response time estimating method of the simultaneous ring system in accordance with the example embodiment.
Figure 8B:
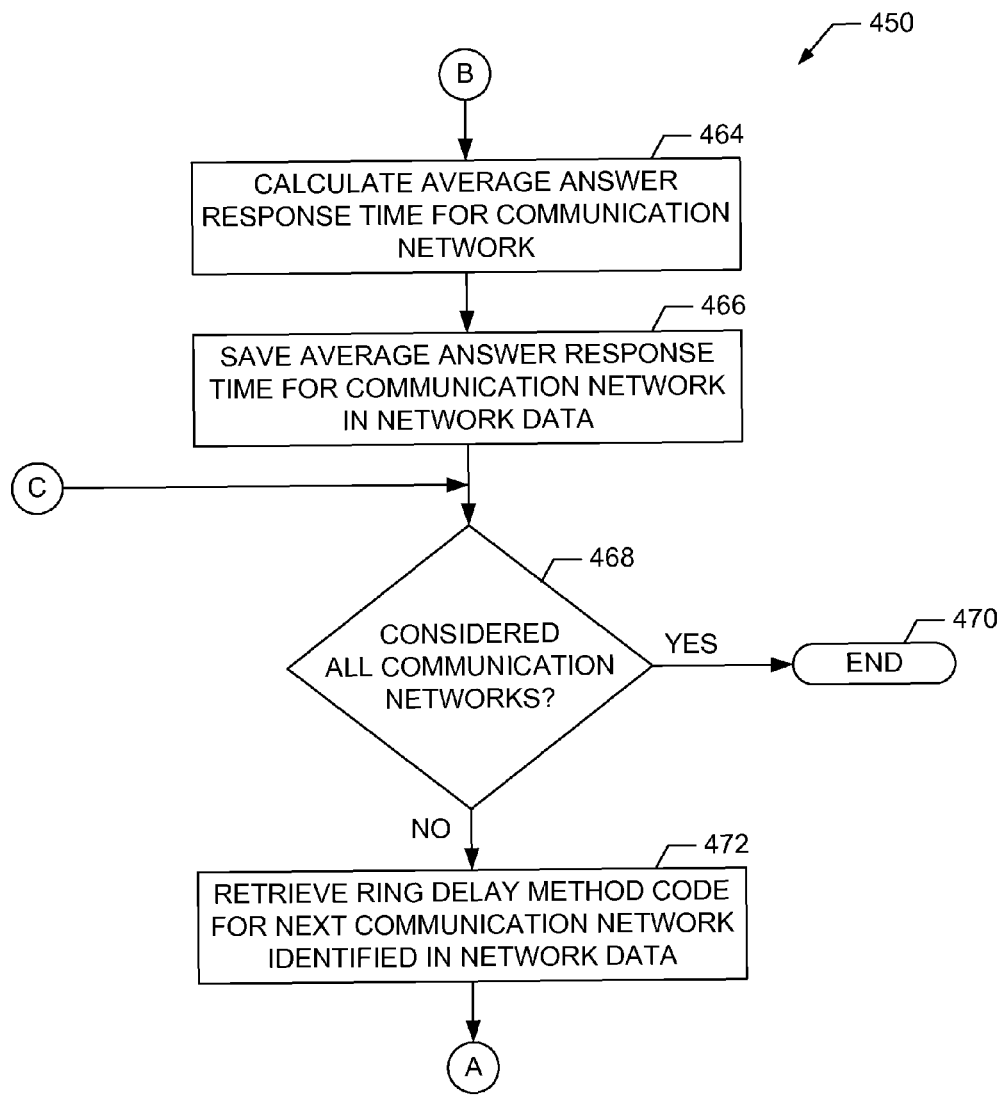

FIG. 8 displays a flowchart representation of a non-polling response time estimating method 450 of the simring system 100 according to the example embodiment. The non-polling response time estimating method 450 is implemented by execution of the non-polling response time estimating application 168C by a processing unit 152 of the simring server 150. By operating in accordance with the non-polling response time estimating method 450 (also sometimes referred to herein as "method 450"), the simring system 100 produces average ring and answer response times for each communication network 106 providing telecommunications services to termination endpoints 104. The average ring and answer response times for the communication networks 106 are used by the simring system 100 as average ring and answer response times for those termination endpoints 104 that receive telecommunications services, respectively, from such communication networks 106 and for which polling cannot be utilized to estimate ring and/or answer response times. Typically, the non-polling response time estimating application 168C is not executed continually, but is instead executed by a processing unit 152 at pre-determined times prior to execution of the ring/send delay estimating application 168E.

After starting operation according to the non-polling response time estimating method 450 at step 452 thereof, the processing unit 152 retrieves, at step 454, the ring delay method code 272 for the first communication network 106 for which data is present in network data 172B. Then, at step 456, the processing unit 152 considers the retrieved ring delay method code 272 and determines if the polling method is to be used for calculating the estimated ring delays for termination endpoints 104 that receive telecommunications services from the communication network. If the processing unit 152 determines that the polling method is to be used to determine estimated ring delays for termination endpoints 104 serviced by the communication network 106 (and, hence, that the communication network 106 supports polling), the processing unit 152 advances to step 468 described below. If, however, the processing unit 152 determines, at step 456, that the polling method is not to be used, then the processing unit 152 continues operation according to method 450 at step 458 where the processing unit 152 decides, based at least on the retrieved ring delay method code 272, if the ring response method is to be used to determine ring delays for termination endpoints 104 serviced by the communication network 106 (and, hence, that the communication network 106 accurately sends ring response messages to received ring messages). If the processing unit 152 decides, at step 458, that the ring response method is not to be used to determine ring delays, then the answer response method must be used to calculate ring delay and the processing unit 152 branches to step 464 of method 450 described below.

If, at step 458, the processing unit 152 decides that the communication network 106 accurately sends ring response messages to received ring messages, then the ring response method is to be used to calculate a ring response time for the communication network 106 and the processing unit 152 continues operation according to method 450 at step 460. There, the processing unit 152 calculates an average ring response time for the communication network 106. To do so, the processing unit 152 uses the communication network identifier 270 from network data 172B for the communication network 106 being considered as an index for the communication network identifier 294 of the call data 172C in order to retrieve data for telephone calls made to termination endpoints 104 serviced by such communication network 106. The processing unit 152 then extracts the ring response times 300 for each telephone call and sums them together to compute a total ring response time sum before dividing the total ring response time sum by the number of telephone calls for which data has been retrieved to calculate an average ring response time for the communication network 106. Then, the processing unit 152 saves the calculated average ring response time in the network data 172B for the communication network 106 as average ring response time 274 at step 462 and branches ahead to step 468 described below.

At step 464 of method 450, the processing unit 152 calculates an average answer response time for the communication network 106. Similar to the calculation of an average ring response time described above, the processing unit 152 uses the communication network identifier 270 from network data 172B for the communication network 106 for which the calculation is being made as an index for the communication network identifier 294 of the call data 172C to retrieve data for telephone calls made to termination endpoints 104 services by such communication network 106. Next, the processing unit 152 extracts the answer response times 304 for each telephone call from the retrieved data and adds them together to compute a total answer response time that is then divided by the number of telephone calls for which data has been retrieved in order to calculate an average answer response time for the communication network 106. After calculating the average answer response time, the processing unit 152 continues operation according to method 450 at step 466 thereof where the processing unit 152 saves the calculated average answer response time in the network data 172B for the communication network 106 as average answer response time 276.

At step 468, the processing unit 152 ascertains whether all communication networks 106 for which data exists in network data 172B have been considered. If so, the processing unit 152 ends operation in accordance with method 450 at step 470. If not, the processing unit 152 retrieves the ring delay method code 272 for the next communication network 106 for which data is present in network data 172B at step 472. Then, the processing unit 152 loops back to step 456, described above, to determine if the communication network 106 supports polling.

Figure 9B:
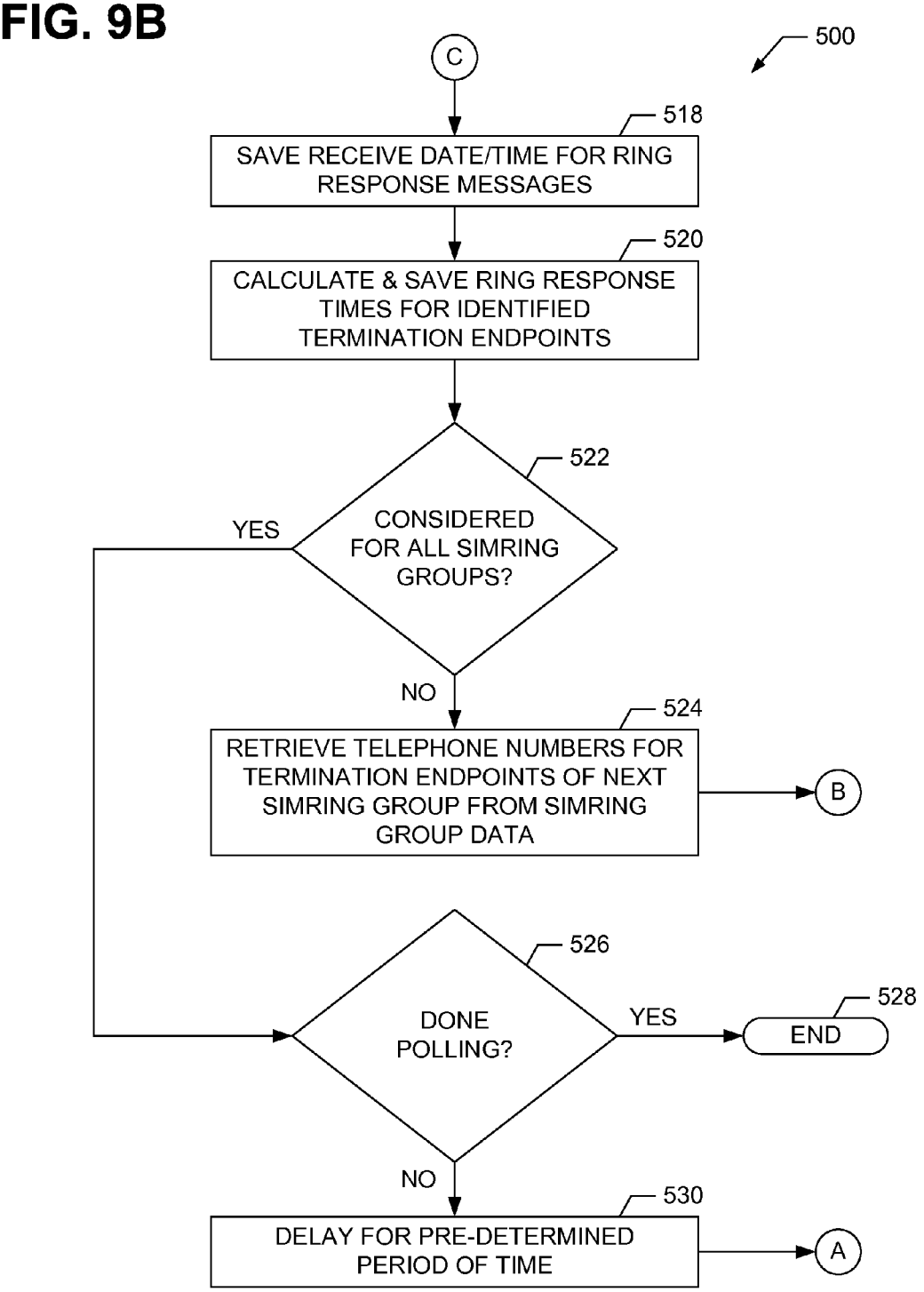

FIGS. 9A-9B display a flowchart representation of a polling response time estimating method 500 of the simring system 100 in accordance with the example embodiment. The polling response time estimating method 500 is implemented by a processing unit 152 of the simring server 150 executing the corresponding polling response time estimating application 168D. Through operation according to the polling response time estimating method 500 (also sometimes referred to herein as "method 500"), the simring system 100 generates multiple ring response times for each of a simring group's termination endpoints 104 for which the polling method of determining ring response times is supported. The determined ring response times are subsequently utilized by the ring/send delay estimating application 168E to determine an average ring response time (and, hence, ring delay) for each such termination endpoint 104. The polling response time estimating application 168D is not generally executed on a continuous basis, but is instead executed by a processing unit 152 at pre-determined times prior to execution of the ring/send delay estimating application 168E.

After beginning operation in accordance with the polling response time estimating method 500 at step 502 thereof, the processing unit 152 retrieves, at step 504, the telephone numbers for the termination endpoints 104 of the first simring group for which data is present in group data 172A. Then, at step 506, the processing unit 152 determines which communication networks 106 (and the communication network identifiers therefor) directly provide telecommunication services to the termination endpoints 104. To do so, the processing unit 152 uses the termination endpoint telephone numbers 252A, 252B, or portions thereof, retrieved from group data 172A to look up an identifier for each such communication network 106 in network cross-reference data 172D. After obtaining the identifiers and at step 508, the processing unit 152 identifies the termination endpoints 104 of the simring group for which the polling method is to be used to determine ring response times and ring delay. The processing unit 152 accomplishes this task by using the identifiers obtained from network cross-reference data 172D as an index for communication network identifier 270 of network data 172B in order to retrieve the ring delay method codes 272 for the various communication networks 106 providing telecommunications services to the termination endpoints 104. The retrieved ring delay method codes 272 indicate the communication networks 106 and, hence, the termination endpoints 104 with which the polling method is to be used for determining ring response times and ring delay therefor.

Next, at step 510, the processing unit 152 generates and sends respective ring messages to each of the termination endpoints 104 with which the polling method is to be used. After sending the ring messages, the processing unit 152, at step 512 and for each sent ring message, saves the telephone number and communication network identifier of the communication network 106 for the termination endpoint 104 and the send date/time for the ring message, respectively, as the termination endpoint telephone number 292, communication network identifier 294, and ring message send date/time 296 in call data 172C. Then, the processing unit 152 receives ring response messages corresponding, respectively, to the ring messages at step 514. The processing unit 152, at step 516, identifies the respective termination endpoints 104 from which the ring response messages were received and the respective call data 172C corresponding to the ring messages that caused the ring response messages. At step 518, the processing unit 152 saves the respective receive date/time for the ring response messages as ring response message receive date/times 298 in call data 172C with the respective ring message data saved in call data 172C at step 512 described above. Subsequently, at step 520, the processing unit 152 calculates and saves respective ring response times as ring response times 300 in call data 172C with the corresponding and related data saved by the processing unit 152 at steps 512 and 518. The ring response times 300 are computed by subtracting the receive date/time for each ring response message from the send date/time for the corresponding ring message.

Proceeding to step 522 of method 500, the processing unit 152 determines whether all simring groups present in group data 172A have been considered. If so, the processing unit 152 branches to step 526 described below. If not, at step 524, the processing unit 152 retrieves the telephone numbers for the termination endpoints 104 of the next simring group for which data is present in group data 172A. After retrieving the telephone numbers, the processing unit 152 loops back to step 506 described above.

At step 526, the processing unit 152 determines if polling of termination endpoints 104 should end. According to the example embodiment, the processing unit 152 makes this determination by comparing the number of ring response times calculated for each termination endpoint 104, as appropriate, against a pre-determined number of ring response times to be calculated for each termination endpoint 104, as appropriate. If the processing unit 152 determines that polling should end, the processing unit 152 ceases operation in accordance with method 500 at step 528 thereof. If, however, the processing unit 152 determines that polling should not end, the processing unit 152 delays for a pre-determined period of time at step 530 before returning to step 504 to begin generating an additional ring response time for each termination endpoint 104 of the simring groups for which polling is to be used to determine a ring response time therefor.

Figure 10A:
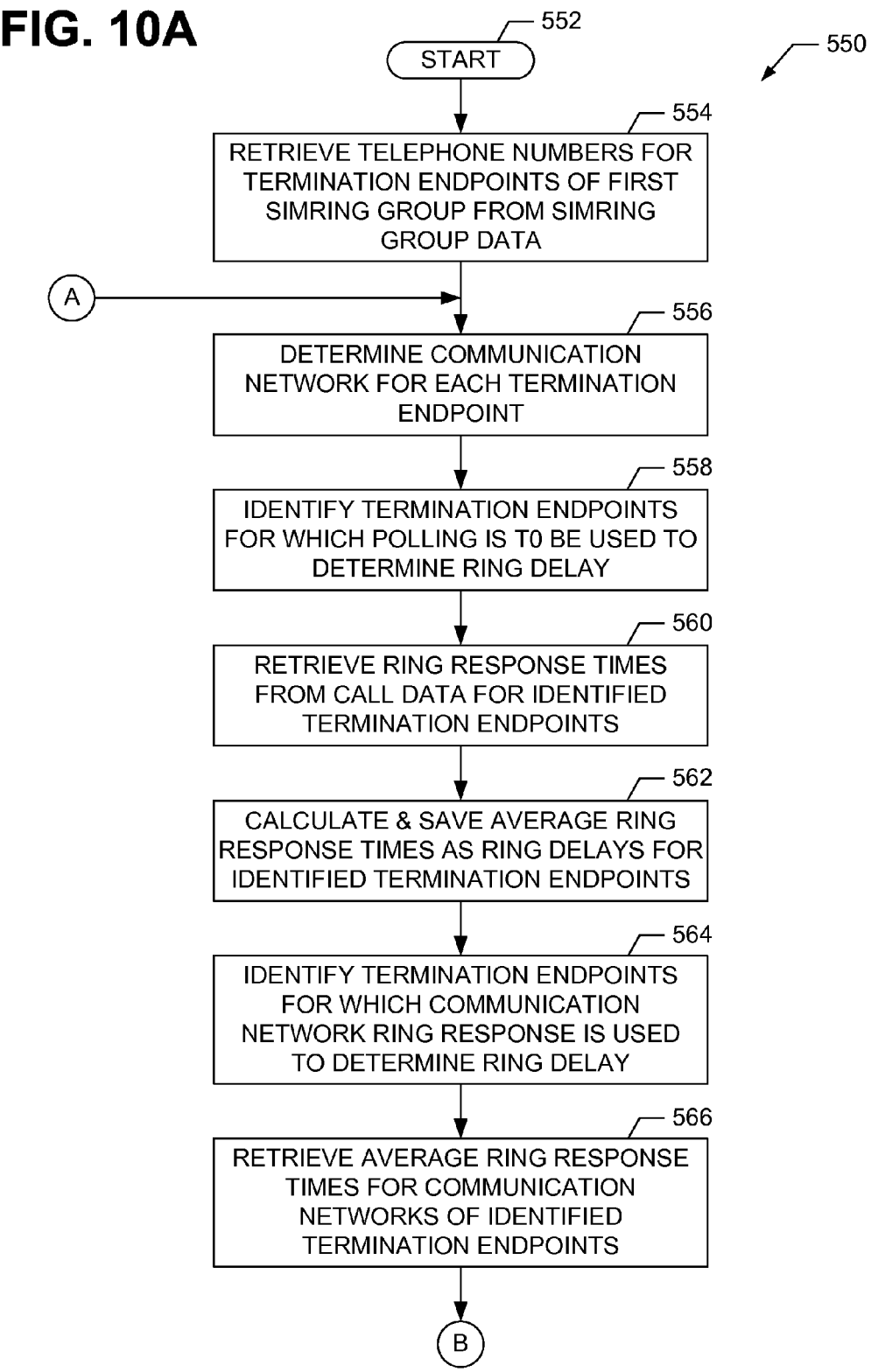
FIGS. 10A-10C display a flowchart representation of a ring/send delay estimating method of the simultaneous ring system in accordance with the example embodiment.
Figure 10B:
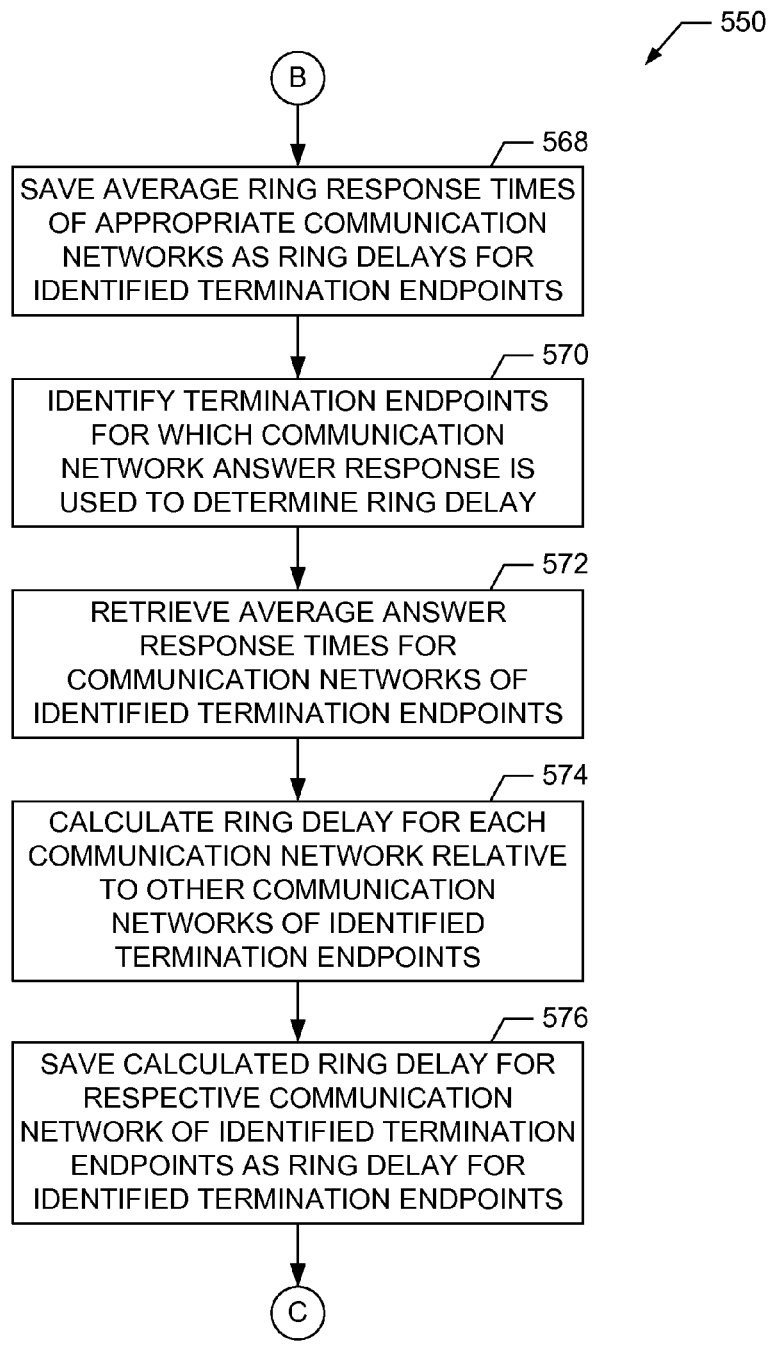
Figure 10C:
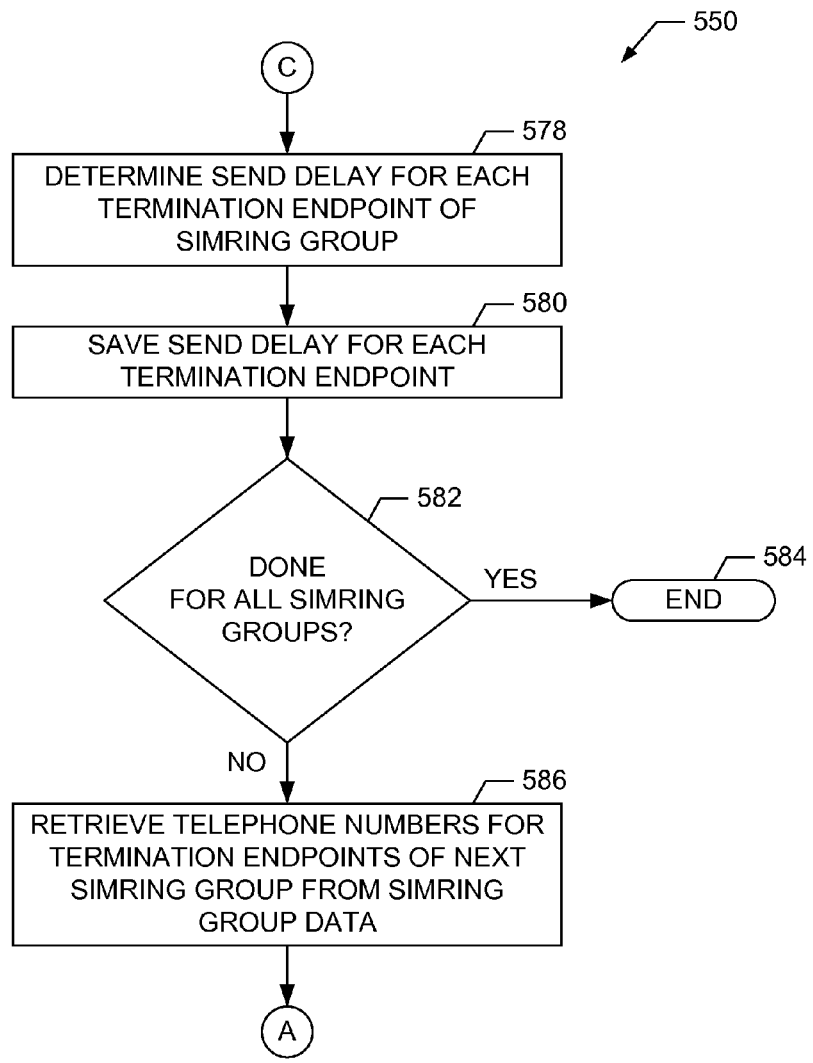

FIGS. 10A-10C display a flowchart representation of a ring/send delay estimating method 550 according to the example embodiment. The ring/send delay estimating method 550 is implemented by execution of the ring/send delay estimating application 168E by a processing unit 152 of the simring server 150. By operating in accordance with the ring/send delay estimating method 550 (also sometimes referred to herein as "method 550"), the simring system 100 produces estimated ring and send delays for each termination endpoint 104 based at least on the pre-identified method to be used for producing estimated ring delay times therefor. The estimated ring and send delays are stored in group data 172A in connection with the termination endpoints 104. The send delays are retrieved and used by the call processing application 168F to determine when ring messages should be sent to each termination endpoint 104 of a simring group relative to the other termination endpoints 104 of the simring group in response to receipt of a call initiation message for the primary termination endpoint 104 of the simring group. Typically, the ring/send delay estimating application 168E is not executed continually, but is instead executed by a processing unit 152 at pre-determined times after execution of the non-polling and polling response time estimating applications 168C, 168D.

After starting operation according to the ring/send delay estimating method 550 at step 552 thereof, the processing unit 152 retrieves, at step 554, the telephone numbers associated with the termination endpoints 104 for the first simring group for which data is present in group data 172A. Next, at step 556, the processing unit 152 determines which communication networks 106 (and the communication network identifiers therefor) directly provide telecommunications services to the termination endpoints 104 of the simring group. To do so, the processing unit 152 utilizes the termination endpoint telephone numbers 252A, 252B, or portions thereof, retrieved from group data 172A for the simring group to obtain an identifier for each such communication network 106 from network cross-reference data 172D. After obtaining the identifiers, the processing unit 152, at step 558, identifies the termination endpoints 104 of the simring group for which the polling method is to be used to determine ring delay times. The processing unit 152 accomplishes this task by using the identifiers obtained from network cross-reference data 172D as an index for communication network identifier 270 of network data 172B in order to retrieve the ring delay method codes 272 for each such communication network 106. The retrieved ring delay method codes 272 indicate the communication networks 106 and, hence, the termination endpoints 104 with which the polling method is to be used for determining ring delay times therefor.

Continuing at step 560 of method 550, the processing unit 152 retrieves the ring response times from call data 172C for the termination endpoints 104 of the simring group for which use of the polling method is indicated for determining ring delay times. The retrieved ring response times were previously generated, as described above, by execution of the polling response time estimating application 168D. In order to retrieve the ring response time for each such termination endpoint 104 from call data 172C, the processing unit 152 uses the telephone number associated with each such termination endpoint 104 as an index for the termination endpoint telephone number 292 of call data 172C. By virtue of the polling method being used to determine ring delay times, the call data 172C generally includes data for multiple polling telephone calls initiated by the simring system 100 to each such termination endpoint 104 and, hence, includes multiple ring response times for each such termination endpoint 104.

Next, at step 562, the processing unit 152 uses the retrieved ring response times to calculate an average ring response time for each of the termination endpoints 104 of the simring group for which use of the polling method is indicated for determining ring delay times. For each such termination endpoint 104, the retrieved ring response times represent actual ring response times for, and unique to, each such termination endpoint 104 because the polling method was used for their determination. Therefore, even though the calculated average ring response time for each such termination endpoint 104 comprises an estimate due to typical and/or random variations in communications performance, the calculated average ring response time is more accurate than would be the case if other methods described herein were utilized to determine the ring delay times. Further, the calculated average ring response time for each such termination endpoint 104 is unique to the termination endpoint 104 and is not based on data collected for other termination endpoints 104 serviced by the same communication network 106 as with the other methods described herein. Once the processing unit 152 has calculated the average ring response time for each of the termination endpoints 104 of the simring group for which use of the polling method is indicated, the processing unit 152 saves the calculated average ring response times in group data 172A as the estimated primary termination endpoint ring delay 254A or estimated secondary termination endpoint ring delay 254B, as the case may be, for the respective termination endpoint 104.

After the processing unit 152 has determined and stored estimated ring delays for those termination endpoints 104 of the simring group for which the polling method is indicated for use in determining ring delay times, the processing unit 152 continues operation according to method 550 at step 564 thereof. At step 564, the processing unit 152 identifies those termination endpoints 104 of the simring group for which the ring response method is used for determining ring delay times. To do so, the processing unit 152 examines the ring delay method codes 272 retrieved at step 558 described above. Then, at step 566, the processing unit 152 retrieves the average ring response time 274 from network data 172B for each communication network 106 providing telecommunications services directly to the termination endpoints 104 of the simring group for which the ring response method is employed to determine ring delay times. The processing unit 152 accomplishes this task by using the communication network identifier determined at step 556 described above for each such termination endpoint 104 as an index for the communication network identifier 270 of network data 172B to retrieve the average ring response time 274.

Proceeding to step 568 of method 550 and for each termination endpoint 104 of the simring group for which the ring response method is used, the processing unit 152 saves, in group data 172A, the retrieved average ring response time 274 for the communication network 106 servicing the termination endpoint 104 as the estimated primary termination endpoint ring delay 254A or estimated secondary termination endpoint ring delay 254B, as appropriate for the termination endpoint 104. Because the average ring response time 274 corresponds to an average ring response time for multiple termination endpoints 104 receiving telecommunications services from a particular communication network 106 and because the average ring response time is used as the estimated ring delay for termination endpoints 104 in accordance with the ring response method, the estimated ring delay for each termination endpoint 104 is not individualized as is done by the polling method and, hence, is probably not as accurate with respect to each termination endpoint 104.

Next, at step 570, the processing unit 152 identifies termination endpoints 104 of the simring group for which the answer response method is to be employed for determining ring delay times. In order to do so, the processing unit 152 examines the ring delay method codes 272 retrieved at step 558 described above. The processing unit 152, at step 572, retrieves the average answer response time 276 from network data 172B for each communication network 106 providing telecommunications services directly to the termination endpoints 104 of the simring group for which the answer response method is employed to determine ring delay times. This task is performed by the processing unit 152 using the communication network identifier determined at step 556 described above for each such termination endpoint 104 as an index for the communication network identifier 270 of network data 172B to retrieve the average answer response time 276.

Advancing to step 574, the processing unit 152 calculates the ring delay for each of the communication networks 106 that respectively provides telecommunications services to the termination endpoints 104 identified at step 570 described above. To do so, the processing unit 152 considers the average answer response times 276 previously retrieved for each such communication network 106 at step 572 and identifies the communication network 106 having the slowest average answer response time 276. Since the ring delay is a fraction of the answer delay for a communication network 106, the processing unit 152 divides the average answer response time 276 for each communication network 106 by a network delay constant for the communication network 106 having the slowest average answer response time in order to respectively calculate the ring delay for each communication network 106. According to the example embodiment, a value of two is often used for the network delay constant. The network delay constant accounts for the fact that several messages must be exchanged with a termination endpoint 104 to determine an answer response time for a telephone call made to the termination endpoint 104.

Continuing at step 576 of method 550 and for each termination endpoint 106 of the simring group for which the answer response method is used for determining ring delay, the processing unit 152 saves, in group data 172A the ring delays calculated for the communication networks 106 at step 574 that respectively service such termination endpoints 104 as the estimated primary termination endpoint ring delay 254A or estimated secondary termination endpoint ring delay 254B, as the case may be. Because the estimated ring delays for the communication networks 106 were calculated based at least on average answer response times, the accuracy of the estimated ring delays is inherently tied to various considerations pertaining to the different communication networks 106. Such considerations may relate to, for example and not limitation, the amount of ring time typically passing for a telephone call before automatic answering or the proximity of termination endpoints 104 to users thereof. Further and similar to estimated ring delays determined using the ring response method, the estimated ring delays calculated for termination endpoints 104 using the answer response method are not individualized as in the polling method. For at least these reasons, the estimated ring delays that are calculated using the answer response method are probably not as accurate with respect to each termination endpoint 104 as are the estimated ring delays calculated using the polling or ring response methods.

Proceeding to step 578, the processing unit 152 determines the estimated send delay for each termination endpoint 104 of the simring group. According to the example embodiment, determination of the estimated send delays begins with the processing unit 152 examining the estimated ring delays calculated for each termination endpoint 104 as described above. Through such examination, the processing unit 152 identifies the termination endpoint 104 having the largest estimated ring delay. Then, the processing unit 152 individually substracts the estimated ring delay for each termination endpoint 104 of the simring group from the estimated ring delay for the termination endpoint 104 having the largest estimated ring delay. The result for each termination endpoint 104 comprises the estimated send delay for that termination endpoint 104. Then, at step 580, the processing unit 152 saves the respective estimated send delay for each termination endpoint 104 of the simring group as the estimated primary termination endpoint send delay 256A or estimated secondary termination endpoint send delay 256B, as appropriate, in group data 172A.

At step 582, the processing unit 152 determines whether estimated ring and send delays have been calculated and stored for all of the simring groups for which data is present in group data 172A. If so, the processing unit 152 ceases operation in accordance with the ring/send delay estimating method 550 at step 584. If not, the processing unit 152 moves ahead to step 586 where the processing unit 152 retrieves the telephone numbers associated with the termination endpoints 104 for the next simring group having data present in group data 172A. Subsequently, the processing unit 152 returns to step 556 described above to begin the process of determining estimated ring and send delays for termination endpoints 104 of the next simring group.

Figure 11:
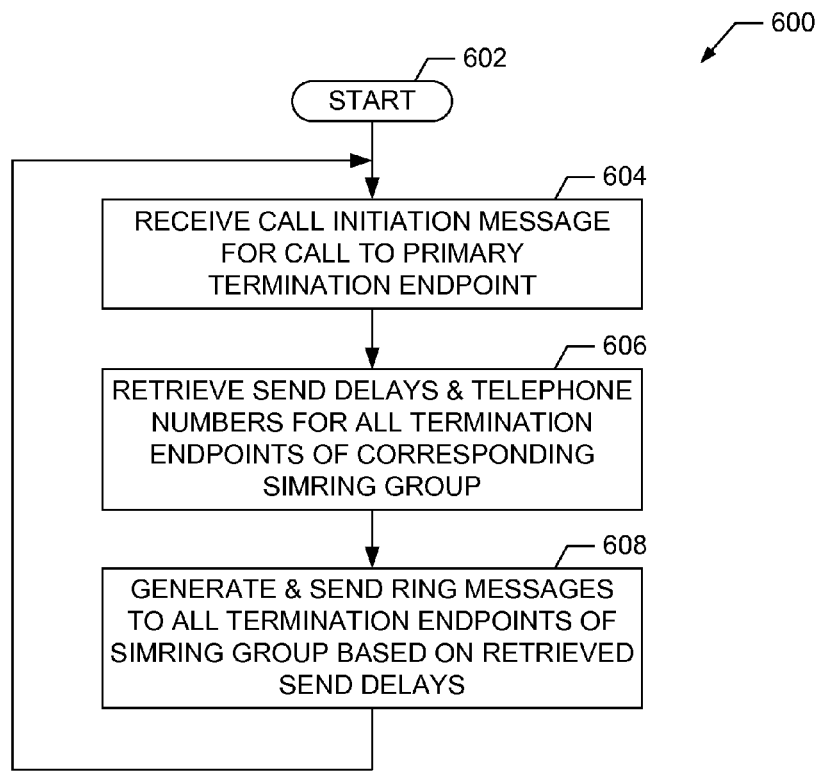
FIG. 11 displays a flowchart representation of a call processing method of the simultaneous ring system in accordance with the example embodiment.

FIG. 11 displays a flowchart representation of a call processing method 600 in accordance with the example embodiment. The call processing method 600 is implemented by corresponding call processing application 168F and a processing unit's execution thereof. Through operation according to the call processing method 600 (also sometimes referred to herein as "method 600"), the simring system 100 generates and sends ring messages to the termination endpoints 104 of a simring group using the estimated send delays calculated and stored for the termination endpoints 104 of the simring group by the ring/send delay estimating application 168E. Typically, a processing unit 152 of the simring server 150 executes the call processing application 168F continually in order to provide simring services to simring services subscribers whenever a telephone call is placed to a primary termination endpoint 104 of the subscriber.

After beginning operation in accordance with the call processing method 600 at step 602 thereof, the processing unit 152 receives a call initiation message from communication network 106A corresponding to a telephone call being initiated by an origination endpoint 102 to a primary termination endpoint 104A of a simring group. The call initiation message is routed to the simring system 100 and, hence, to processing unit 152 by infrastructure within the communication network 106A determining that the telecommunications subscriber utilizing the primary termination endpoint 104A is a simring services subscriber.

Next, at step 606, the processing unit 152 retrieves estimated send delays and telephone numbers for all of the termination endpoints 104 of the simring group with which the primary termination endpoint 104A is associated. In accordance with the example embodiment, the processing unit 152 performs this task by extracting the telephone number of the termination endpoint 104 from the received call initiation message and using the telephone number as an index for the primary termination endpoint telephone number 252A of the group data 172A. Using the estimated send delays retrieved from group data 172A as primary and secondary termination endpoint send delays 256A, 256B and corresponding telephone numbers retrieved as primary and secondary termination endpoint telephone numbers 252A, 252B, the processing unit 152 generates and sends, at step 608, respective ring messages to each of the termination endpoints 104 of the simring group. The ring messages are sent at staggered times according to the estimated send delays by sending the ring message for the termination endpoint 104 having the lowest estimated send delay first followed by sending of the ring messages for the other termination endpoints 104 offset in time from the time at which the first ring message was sent by the respective amount of time of the estimated send delay for each such termination endpoint 104. By sending ring messages to the termination endpoints 104 of the simring group in this manner, each of the termination endpoints 104 should receive the ring message sent thereto by the processing unit 152 at substantially the same time, thereby causing ringing of all of the termination endpoints 104 of the simring group at substantially the same time. After sending all of the ring messages, the processing unit 152 returns to step 604 of method 600 where the processing unit 152 receives another call initiation message directed to a primary termination endpoint 104 of a simring group.

Whereas the present invention has been described in detail above with respect to an example embodiment thereof, it should be appreciated that variations and modifications might be effected within the spirit and scope of the present invention, as described herein before and as defined in the appended claims.

What is claimed is:

1. A method for causing simultaneous or near simultaneous delivery to multiple communication termination endpoints of electronic invitation messages to join a communication session, the method comprising the steps of:
    receiving information identifying a first communication termination endpoint receiving telecommunications services from a first communication network;
    receiving information identifying a second communication termination endpoint receiving telecommunications services from a second communication network;
    associating the first and second communication termination endpoints in a group for receiving at substantially the same time respective electronic invitation messages to join a communication session;
    determining a first send time delay for electronic invitation messages being sent to the first communication termination endpoint;
    determining a second send time delay for electronic invitation messages being sent to the second communication termination endpoint;
    in response to receiving an electronic message requesting initiation of a communication session, sending an electronic invitation message to the first communication termination endpoint at a first time; and
    in response to receiving the electronic message requesting initiation of the communication session, sending an electronic invitation message to the second communication termination endpoint at a second time after and offset from the first time by the amount of time difference between the first and second send time delays,
    wherein at least one of the first or second send time delays is based at least in part on data collected by polling of the first or second communication termination endpoint.

2. The method of claim 1, wherein at least one of the first or second send time delays is based at least in part on data collected in relation to electronic invitation messages for prior communication sessions.

3. The method of claim 2, wherein the data corresponds to ring response times.

4. The method of claim 2, wherein the data corresponds to answer response times.

5. The method of claim 1, wherein the first send time delay is based at least in part on data collected in relation to electronic invitation messages for prior communication sessions with the first communication termination endpoint and with other communication termination endpoints receiving telecommunications services from the first communication network.

6. The method of claim 1, wherein the second send time delay is based at least in part on data collected in relation to electronic invitation messages for prior communication sessions with the second communication termination endpoint and with other communication termination endpoints receiving telecommunications services from the second communication network.

7. An apparatus for causing simultaneous or near simultaneous delivery to multiple communication termination endpoints of electronic invitation messages to join a communication session, the apparatus comprising:
    a server computer communicatively connected to a communication network and configured to receive an electronic message requesting initiation of a communication session with a first communication termination endpoint of a group of communication termination endpoints, said server computer being further configured to send an electronic invite message for the communication session to each communication termination endpoint of said group of communication termination endpoints in accordance with respective send time delays for the communication termination endpoints determined to cause said electronic invite messages to arrive at the communication termination endpoints at substantially the same time, said server computer further configured to communicate electronic polling invite messages and corresponding electronic response messages with at least one communication termination endpoint of said group of termination endpoints and to determine said send time delay uniquely for the at least one communication termination endpoint based on the amount of time passing between sending of respective electronic polling invite messages and receipt of corresponding electronic response messages.

8. The apparatus of claim 7, wherein one or more communication network is communicatively connected between said server computer and a communication termination endpoint of said group of communication termination endpoints, and wherein said server computer is further configured to determine said send time delay for the communication termination endpoint based at least on communication delays determined for the one or more communication network.

9. The apparatus of claim 8, wherein said server computer is further configured to collect ring response data representative of the communication delays and to determine said send time delay based at least on said ring response data.

10. The apparatus of claim 8, wherein said server computer is further configured to collect answer response data representative of the communication delays and to determine said send time delay based at least on said answer response data.

11. The apparatus of claim 7, wherein said communication session comprises a telephone call.

12. The apparatus of claim 7, wherein said communication session comprises a communication session for the communication of video data.

13. A method for causing simultaneous or near simultaneous delivery to multiple communication termination endpoints of electronic invitation messages to join a communication session, the method comprising the steps of:
    receiving a first electronic message via a communication network requesting initiation of a communication session with an origination endpoint;
    in response to receiving the first electronic message, sending a second electronic message via a communication network to a first termination endpoint inviting the first termination endpoint to join the communication session with the origination endpoint, the second electronic message being sent at a first time after receipt of the first electronic message; and
    in response to receiving the first electronic message, sending a third electronic message via a communication network to a second termination endpoint associated with the first termination endpoint and inviting the second termination endpoint to join the communication session with the origination endpoint, the third electronic message being sent at a second time after receipt of the first electronic message so as to cause receipt of the second electronic message by the first termination endpoint and receipt of the third electronic message by the second termination endpoint at substantially the same time, wherein, prior to the steps of sending a second electronic message and sending a third electronic message, a step of determining the amount of time between the first time and the second time, the determining further comprising estimating the time delay for the first termination endpoint between the sending of an electronic invitation message to the first termination endpoint inviting the first termination endpoint to join a communication session and the receipt of an electronic response message confirming receipt of the electronic invitation message, the estimating further comprising repeatedly polling the first termination endpoint.

14. The method of claim 13, wherein the step of determining further comprises the steps of:

estimating the time delay for the second termination endpoint between the sending of an electronic invitation message to the second termination endpoint inviting the second termination endpoint to join a communication session and the receipt of an electronic response message confirming receipt of the electronic invitation message; and calculating the amount of time difference between the estimated time delay for the first termination endpoint and the estimated time delay for the second termination endpoint.

15. The method of claim 14, wherein the estimated time delay for the first termination endpoint comprises an estimated average time delay for the first termination endpoint, and the estimated time delay for the second termination endpoint comprises an estimated average time delay for the second termination endpoint.

16. The method of claim 13, wherein the step of determining comprises the steps of:

estimating the time delay for the first termination endpoint between the sending of an electronic invitation message to the first termination endpoint inviting the first termination endpoint to join a communication session and the receipt of an electronic answer message indicating the first termination endpoint has joined the communication session;

estimating the time delay for the second termination endpoint between the sending of an electronic invitation message to the second termination endpoint inviting the second termination endpoint to join a communication session and the receipt of an electronic answer message indicating the second termination endpoint has joined the communication session; and calculating the amount of time difference between the estimated time delay for the first termination endpoint and the estimated time delay for the second termination endpoint.

17. The method of claim 13, wherein the communication session comprises a telephone call.

* * * * *